United States Patent
Takenaka et al.

(10) Patent No.: US 6,415,310 B1
(45) Date of Patent: Jul. 2, 2002

(54) REMAINDER CALCULATING METHOD, MODULAR-MULTIPLICATION METHOD, REMAINDER CALCULATING APPARATUS, MODULAR-MULTIPLICATION APPARATUS AND RECORDING MEDIUM

(75) Inventors: Masahiko Takenaka; Naoya Torii, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/412,502

(22) Filed: Oct. 5, 1999

(30) Foreign Application Priority Data

Oct. 27, 1998 (JP) .......................... 10-305911

(51) Int. Cl.$^7$ ............................................. G06F 7/72
(52) U.S. Cl. ...................................... 708/491
(58) Field of Search ........................... 708/491

(56) References Cited

U.S. PATENT DOCUMENTS

| | | | |
|---|---|---|---|
| 5,159,632 A | 10/1992 | Crandall | 380/28 |
| 5,271,061 A | 12/1993 | Crandall | 380/28 |
| 5,442,707 A | 8/1995 | Miyaji et al. | 380/30 |
| 5,644,639 A * | 7/1997 | Naciri et al. | 708/491 |
| 5,724,279 A * | 3/1998 | Benaloh et al. | 708/491 |
| 5,764,554 A * | 6/1998 | Monier | 708/491 |
| 5,793,659 A * | 8/1998 | Chen et al. | 708/491 |
| 5,793,660 A * | 8/1998 | Rentschler | 708/491 |
| 6,163,790 A * | 12/2000 | Monier | 708/491 |
| 6,175,850 B1 * | 1/2001 | Ishii et al. | 708/491 |
| 6,230,178 B1 * | 5/2001 | Pomet | 708/491 |

FOREIGN PATENT DOCUMENTS

JP 7-20778 1/1995

OTHER PUBLICATIONS

Peter L. Montgomery, Modular Multiplication Without Trial Division, *Mathematics of Computation*, vol. 44, No. 170, Apr. 1985, pp. 519–521.
Atsushi Shimbo, et al., Elliptic Curve Cryptosystem Applying Montgomery Arithmetic, *The Electric Information and Communication Society*, 1988.

* cited by examiner

*Primary Examiner*—David H. Malzahn
(74) *Attorney, Agent, or Firm*—Staas & Halsey LLP

(57) ABSTRACT

In a remainder calculating method and a modular-multiplication method on the basis of a Montgomery method, a number expressed by N ($N=c2^d\pm1$) is used as a divisor N. In order to calculate a remainder in the case of dividing a dividend Y by a divisor N on the basis of a Montgomery method, a number expressed by a condition of $N=c2^d-1$ is used as the divisor N, and the following steps are repeatedly carried out; the steps includes: a step of adding a product of a least digit value $y_o$ of the dividend Y and c to a lower d-bit position of the dividend Y; and a step of setting a portion excluding the least digit of the additive result as a next dividend.

20 Claims, 22 Drawing Sheets

$N = c2^d - 1$
$m = y_0$
$mN = y_0 c2^d - y_0$ $N = c 2^d - 1$
$m = y_0$
$mN = y_0 c 2^d - y_0$
$y_0 = 0$ PROCESS OMISSION $N = c2^d - 1$
$m = y_0$
$mN = y_0 c2^d - y_0$
$y_0 = 0$ PROCESS OMISSION
$d = ek$ $N = c2^d + 1$
$m = -y_0$
$mN = y_0 c2^d + m$ $N = c2^d + 1$
$m = -y_0$
$mN = y_0 c2^d + m$
$d = ek$ $N = c2^d - 1$ $N = c2^d - 1$
$y_0 = 0$ PROCESS OMISSION $N = c2^d + 1$ $N = c2^d + 1$
$d = ek$

REMAINDER CALCULATING METHOD, MODULAR-MULTIPLICATION METHOD, REMAINDER CALCULATING APPARATUS, MODULAR-MULTIPLICATION APPARATUS AND RECORDING MEDIUM

BACKGROUND OF THE INVENTION

The present invention relates to a remainder calculating method and apparatus, a modular-multiplication method and apparatus, and a recording medium, which are suitable for a remainder calculation, a modular-multiplication in RSA encryption processing, elliptic curve encryption processing of a public key cryptosystem. In particular, the present invention relates to a remainder calculating method and apparatus, a modular-multiplication method and apparatus, and a recording medium, which can carry out a calculation at a high speed with the use of Montgomery algorithm (see Modular Multiplication Without Trial Division. Peter L. Montgomery, Mathematics of Computation, Volume 44, Number 170, April 1985 pp. 519–521).

In recent years, the development of a computer network has rapidly increased an opportunity to retrieve a data base, or to send and receive electronic information such as an electronic mail and electronic news via a network. Moreover, an on-line shopping service or the like is provided by making use of the computer network. However, with the development of the computer network, the following problems have been pointed out; more specifically, electronic data on the network is tapped or falsified, and a certain person pretends to be another person so as to receive service without charge. In particular, tapping is easy in a network using a radio communication; for this reason, it is desired to take suitable measures for preventing the tapping.

In order to solve the aforesaid problems, an encryption electronic mail system and a user certification system using cryptography are proposed, and then, are being introduced into various networks. Therefore, it is a matter of course that encryption is an indispensable technology in the computer network. As one of the above cryptography, there is a public key cryptosystem which is suitable for digital signature, that is, for certification. However, a large quantity of processing is required for encryption/decryption;

for this reason, it is desired to carry out the encryption/decryption processing at a high speed, and various high-speed algorithms have been published.

The above cryptosystem is largely classified into two, that is, a secret key cryptosystem and a public key cryptosystem. The secret key cryptosystem is a system such that a sender and a receiver mutually have the same cryptographic key so as to carry out a cryptographic communication. More specifically, in the secret key cryptosystem, a certain message is encrypted on the basis of a secret cryptographic key, and thereafter, is sent to a receiver. Then, the receiver decrypts the encrypted message with the use of the cryptographic key so as to return it to the original message, and thus, obtains an information.

The public key cryptosystem is a system such that a sender encrypts a message with the use of a published receiver's public key, so as to send it to the receiver, and then, the receiver decrypts the encrypted message with the use of his secret key, and thus, a communication is performed. More specifically, in the public key cryptosystem, the public key is a key used for encryption, and the secret key is a key used for decrypting a message encrypted by the public key, and further, the message encrypted by the public key can be decrypted by only secret key.

In the aforesaid secret key cryptosystem, a key, in which a private individual must keep in secret, requires by the number of communicating partners, and the total number of required keys is $n(n-1)/2$ in the case of n person network. Moreover, the secret key cryptosystem has a problem that a secret key must be distributed according to a certain method with respect to a partner who makes a communication for the first time. In order to solve the problem, a key control center is established in a large scale network, and the private individual keeps only secret key between the center and himself. In the case of carrying out a cryptographic communication, a method of obtaining a secret key with the communicating partner from the center is employed. In this case, the total number of secret keys is n.

On the other hand, in the public key cryptosystem, a key, in which a private individual should keep in secret, is only his own secret key, and the total number of required secret keys is n in the case of n person network. Moreover, a public key may be only distributed with respect to a partner who makes a communication for the first time, and a key control center is established. Then, n users' public keys are registered in a public board, and a method of obtaining a public key of the communicating partner from the center is employed. In this case, the center merely prevents a falsification of the public key, and has no need of keeping the public key in secret. However, in the public key cryptosystem, the number of bits of the public key is much as compared with the secret key cryptosystem; for this reason, a file size required for storing it becomes large.

In the case of certification, in the secret key cryptosystem, for example, a message to be sent is compressed and converted with the use of a secret key, and then, is sent in a state of being added to a sending text. In a receiving end, the message is compressed and converted, and then, makes a comparison. In this case, however, send/receive is carried out with the use of the same key; for this reason, a receiver can counterfeit a certification data. On the contrary, the public key cryptosystem makes use of the feature that it is only person himself to encrypt the message with the use of the secret key. A sender compresses and converts the message, and then, encrypts it with the use of the secret key, and thus, sends it in a state of being added to a sending text. On the other hand, the receiver decrypts the added data with the use of sender's public key, and then, makes a comparison with the message similarly compressed and converted. In this case, the receiver can not make an illegal act.

As described above, in the certification system, the technology of public key cryptosystem is indispensable. However, the public key cryptosystem has a severe problem that a large quantity of processing is required for encryption/decryption. For this reason, in general, the secret key cryptosystem of high speed processing is used for an encryption of message, and the public key cryptosystem is used for certification, and thus, the above two cryptosystems are often used in combination with each other.

The public key cryptosystem mainly includes an RSA cryptosystem and an elliptic curve cryptosystem. In particular, the elliptic curve cryptosystem is noticeable because a small number of bits is required for obtaining the same safety as the RSA cryptosystem. In the elliptic curve cryptosystem, there are a cryptosystem defined on a prime field and a cryptosystem defined on two extension fields, and both cryptosystems are based on a discrete logarithm problem on an elliptic curve. A basic calculation of the elliptic curve cryptosystem is an addition of points on an elliptic curve. The following is a description on an additive algorithm in points on an elliptic curve on a prime field. (Additive algorithm in points on an elliptic curve on a prime field)

elliptic curve: $y^2=x^3+ax+b \pmod{N}$, N: prime number
two points to be added: $(X_1, y_1)$, $(x_2, y_2)$
additive result: $(x_3, y_3)$
An addition on points is expressed as follows $$x_3=\lambda^2-x_1-x_2 \pmod{N};$$

$$y_3=\lambda(x_1-x_3)-y_1 \pmod{N};$$

$$\lambda=(y_2-y_1)/(x_2-x_1) \pmod{N}$$

In general, N, a, b, $x_1$, $y_1$, $x_2$ and $y_2$ are integers each of which has a size of about 160 bits. In the elliptic curve cryptosystem, a great many of the above basic calculations are repeatedly carried out; as a result, a large quantity of multiple precision multiplications and remainder calculations are carried out. For this reason, various high-speed methods such as approximate method, remainder table system, Montgomery's algorithm are proposed as the remainder calculation. Further, unlike the RSA cryptosystem, in the elliptic curve cryptosystem, even in the case where a specific value such as a Mersenne prime number ($2^n-1$) is used as a modulus N of remainder, no influence is given to safety; therefore, there has been proposed a high-speed processing method using the specific value as a modulus N of remainder.

The following is a description on a Montgomery's algorithm which is one method for realizing high-speed processing of the remainder calculation.
(Montgomery Algorithm)

Montgomery algorithm is the following algorithm; more specifically, when using a modulus N (N>1) of remainder and a base R (R>N) which is relatively prime with the modulus N of remainder, a calculation of $TR^{-1}$ mod N from a dividend T is performed by carrying out a division by only base R, and by taking advantage of this merit, a remainder calculation is carried out without using a division by N. In this case, each of N, N', R, $R^{-1}$ and T is an integer, the dividend T satisfies a relation of $0 \leq T < R \cdot N$, $R^{-1}$ is an inverse number of the base R on the modulus N of remainder, and a relation of $R \cdot R^{-1} - N \cdot N' = 1$ ($0 \leq R^{-1} < N$, $0 \leq N' < R$) is satisfied.

Moreover, in the case of using a power of 2 as the base R, the division by the base R is replaced with a shift operation; therefore, it is possible to process the above calculation of $T \to TR^{-1}$ mod N at a high speed. Next, the following is a description on an algorithm REDC(T) of $T \to TR^{-1}$ mod N used as an (Algorithm 1). In the (algorithm 1), it has been proved that $(T+m \cdot N)/R$ is necessarily divisible.
(Algorithm 1)

An algorithm Y=REDC(T) of $T \to TR^{-1}$ mod N is expressed as follows.

$$M = (T \bmod R) \cdot N' \bmod R$$

$$Y = (T + M \cdot N)/R$$

if
  $Y \geq N$ then $Y = Y - N$
  $Y < N$ then return Y

In one-time REDC, a remainder T mod N is not obtained, but only $TR^{-1}$ mod N is obtained. Therefore, in order to obtain the remainder T mod N, the REDC is again carried out with in the following manner by the use of a product of REDC(T) and $R^2$ mod N which has been previously obtained.

$$REDC(REDC(T) \cdot (R^2 \bmod N)) = (TR^{-1} \bmod N) \cdot (R^2 \bmod N) \cdot R^{-1} \bmod N = TR^{-1} \cdot R^2 \cdot R^{-1} \bmod N = T \bmod N$$

In the manner as described above, it is possible to obtain the remainder T mod N.
(Extension of REDC to Multiple Precision Calculation)

In the case where the modulus N of remainder or base R is multi length, that is, multiple precision, the algorithm of REDC is extended. In the case where the modulus N of remainder or base R is multiple precision, the calculation of $(T \bmod R) \cdot N'$ and $M \cdot N$ of REDC becomes multiple precision×multiple precision processing; for this reason, a large quantity of processing and processing time are required in a general computer. In order to avoid the large quantity of processing, the following is shown an (Algorithm 2) in which the above processing is extended so as to be carried out by multiple precision×single precision processing.
(Algorithm 2)

The following is an algorithm in which the REDC is extended to the multiple precision.

A dividend T, a parameter N' and an output variable Y are all r-adic, and $$T=(t_{2g-1}, t_{2g-2}, \ldots, t_0)_r,$$

$$N'=(n'_{g-1}, n'_{g-2}, \ldots, n'_0)_r,$$

$$Y=(y_g, y_{g-1}, \ldots, y_0)_r,$$

$$R=r^g,$$

$$r=2^k$$

In the case where the condition is expressed as shown above, it is possible to obtain $TR^{-1}$ mod N as a calculation of multiple precision×single precision by the following repetitive processing of j=0 to g−1. In this case, the single precision means r-adic one digit, and in the case of using the same character, basically, a large character means a multiple precision, a small character means a single precision, and a small character subscript means a digit of multiple precision. FIG. 1 is a view showing a remainder calculating process by the (Algorithm 2).

$Y=T$ for j=0 to g−1

$m=y_0 n'_0 \bmod r$ $Y=Y+m \cdot N$ $Y=Y/r$ next
if
  $Y \geq N$ then $Y=Y-N$
  $Y < N$ then return Y Then, with the use of a product of the $TR^{-1}$ mod N thus obtained and the previously obtained $R^2$ mod N, the REDC is again carried out, and thereby, a remainder T mod N can be obtained.
(Extension of REDC to Multiple Precision Modular-multiplication)

Next, an REDC algorithm is extended to a modular-multiplication. In the above Algorithm 2, although an input T is a value satisfying a relation of $0 \leq T < R \cdot N$, the input T is often a multiplicative result of integers A and B ($0 \leq A, B < N$). In this case, the multiplication of the integers A and B is a multiple precision integer calculation; for this reason, a repetitive calculation as a multiple precision extension REDC is carried out. In this case, when multiplication and REDC are repeatedly calculated independently from each other, a loss by repetitive computational control becomes twice. In order to avoid the above disadvantage, the following is an (Algorithm 3) in which the multiplication and REDC are extended so as to be carried out by the identical repetitive loop.
(Algorithm 3)

The following is an Algorithm REDC (A×B) which extends the REDC to multiple precision modular-multiplication. Two multipliers A and B, a parameter. N' and an output variable Y are all r-adic, and $A=(a_{g-1}, a_{g-2}, \ldots, a_0)_r,$ $B=(b_{g-1}, b_{g-2}, \ldots, b_0)_r,$ $N'=(n'_{g-1}, n'_{g-2}, \ldots, n'_0)_r,$ $Y=(y_g, y_{g-1}, \ldots, y_0)_r,$ $R=r^g,$ $r=2^k$ In the case where the condition is expressed as shown above, it is possible to obtain $ABR^{-1} \bmod N$ as a calculation multiple precision×single precision by the following repetitive processing of j=0 to g−1. FIG. 2 is a view showing a modular-multiplication process by the (Algorithm 3).

$Y=0$ for $j=0$ to $g-1$ $Y=Y+A \cdot b_j$ $m=y_0 \cdot n'_0 \bmod r$ $Y=Y+m \cdot N$ $Y=Y/r$ next
if
   Y≧N then Y=Y−N
   Y<N then return Y Then, with the use of a product of the $ABR^{-1} \bmod N$ thus obtained and the previously obtained $R^2 \bmod N$, the REDC is again carried out, and thereby, a remainder A·B mod N can be obtained.

As described above, in the elliptic curve cryptosystem, even if a specific prime number (specific parameter) is used as a modulus of remainder, a safety is not lost, and therefore, there is a method such that the specific parameter is used as a divisor so as to carry out a remainder calculation at a high speed. The above method has been conventionally proposed in U.S. Pat. Nos. 5,271,061, 5,159,632, 5,442,707, etc. However, methods proposed in these USPs are not a method of using the specific parameter as a divisor in the case of carrying out a remainder calculation on the basis of a Montgomery method.

One method of the Montgomery method using a specific parameter has been proposed at a general meeting of the electronic information and communication society in 1988 (A-7-11: elliptic curve cryptosystem applying Montgomery arithmetic). This method is as follows. In the case of carrying out a Montgomery remainder of a value C, assuming that a condition of $N=\epsilon 2^{L-K}-1$ (L: number of bits of N, k: number of bits of processing unit, $\epsilon$: k bits) is set as a divisor N, the Montgomery remainder of a value C becomes equal to a Montgomery remainder of $((C/2^{L-K})+\epsilon$ (C mod $2^{L-K}))$. Thus, the Montgomery remainder of a value C is obtained by carrying out one-time multiplication processing of multiple precision×multiple precision; on the other hand, by using the specific parameter, the Montgomery remainder of a value C is obtained by carrying out two-time multiplication processings of multiple precision×single precision.

However, according to the above method, a dimension of number for carrying out a Montgomery division is decreased, and thereby, a computational complexity is merely reduced. Namely, the method does not achieve a reduction of a computational complexity of the Montgomery division by using the specific parameter. Moreover, the used specific parameter has a great limitation of $\epsilon 2^{L-K}-1$.

BRIEF SUMMARY OF THE INVENTION

It is, therefore, a principal object of the present invention to provide a remainder calculating method and apparatus, and a modular-multiplication method and apparatus, which uses a specific parameter having a small limitation such as $c2^d-1$ or $c2^d+1$ as a divisor so as to simplify a remainder calculation and modular-multiplication on the basis of a Montgomery method and to reduce a computational complexity as compared with a conventional case.

Further, another object of the present invention is to provide a recording medium which records a computer readable program for causing a computer to execute the aforesaid remainder method and modular-multiplication method.

According to the present invention, in the remainder method and modular-multiplication method on the basis of a Montgomery method, a number expressed by $N=c2^d\pm 1$ is used as a divisor N. For example, in calculating a remainder of the case where a dividend Y is divided by a divisor N, a number expressed by $N=c2^d-1$ is used as the divisor N, and then, the following steps are repeated. More specifically, the steps include a steps of adding a product of a least digit value yo of the dividend Y and c to a lower d-bit position of the dividend Y, and a step of using a portion excluding the least digit of the additive result as a next dividend.

Thus, it is possible to simplify a calculation in Montgomery remainder method and Montgomery modular-multiplication method so as to reduce a computational complexity.

The above and further objects and features of the invention will more fully be apparent from the following detailed description with accompanying drawings.

DETAILED DESCRIPTION OF THE INVENTION

Each conception of a remainder calculating method and a modular-multiplication method according to the present invention will be described below.

[First Remainder Calculation]

Assuming that the aforesaid divisor N of (Algorithm 2) is set as $N=c2^d-1$ (($d \geq k$, k: number of bits of processing unit), $c=(c_{q-1}, c_{q-2}, \ldots, c_0)_r$), the following effects are obtained. More specifically, 1̂ $m=y_0$, and therefore, a calculation of m and a calculation of $n'_0$ are unnecessary; and 2̂ it is possible to replace a calculation of $Y=Y+m \cdot N$ with a calculation of $Y=Y+y_0 \cdot c2^d$, $y_0=0$.

In the previous method, a multiplication of g×one-time is required; on the contrary, in this method, a multiplication of q×one-time (g>q) and a d-bit shift are required. The method is shown as the following (Algorithm 4).

(Algorithm 4)

A dividend T, a parameter N' and an output variable Y are all r-adic, and $T=(t_{2g-1}, t_{2g-2}, \ldots, t_0)_r$, $N'=(n'_{g-1}, n'_{g-2}, \ldots, n'_0)_r$, $Y=(y_g, y_{g-1}, \ldots, y_0)_r$, $R=r^g$, $r=2^k$, $N=c2^d-1$, $c=(c_{q-1}, c_{q-2}, \ldots, c_0)_r$, $d \geq k$.

Figure 1:
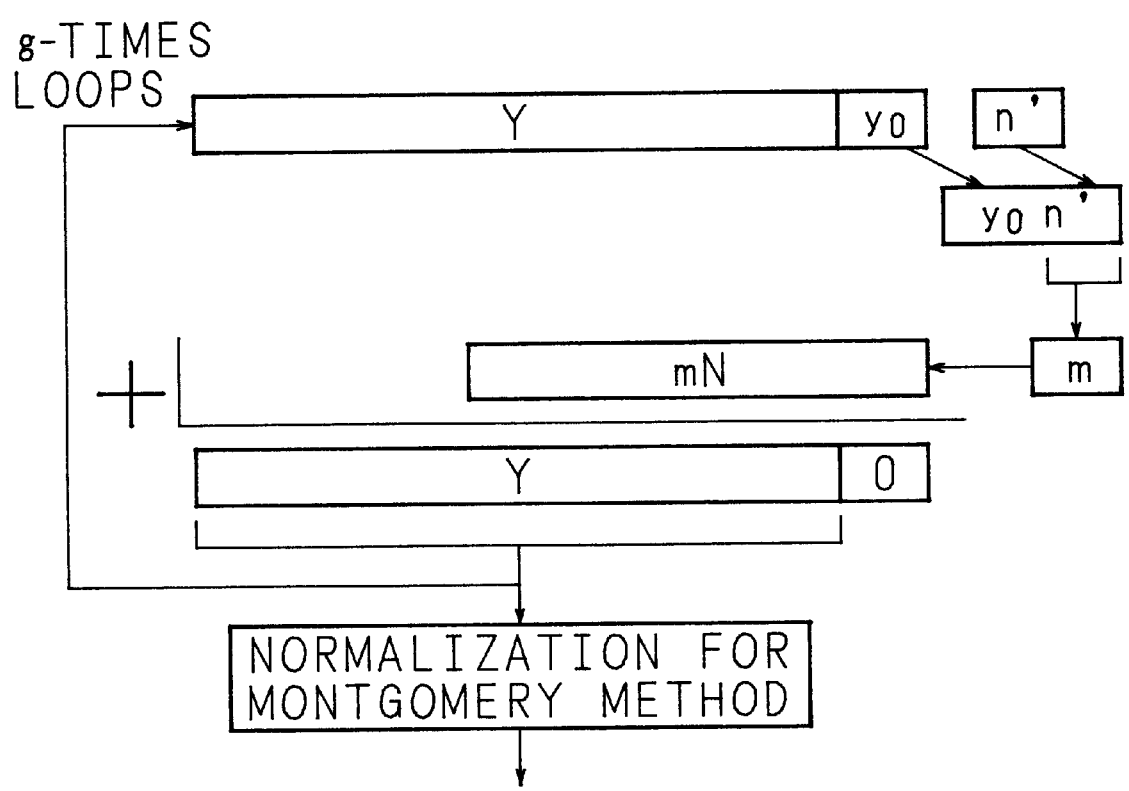
FIG. 1 is a view showing a remainder calculating process in the prior.
Figure 2:
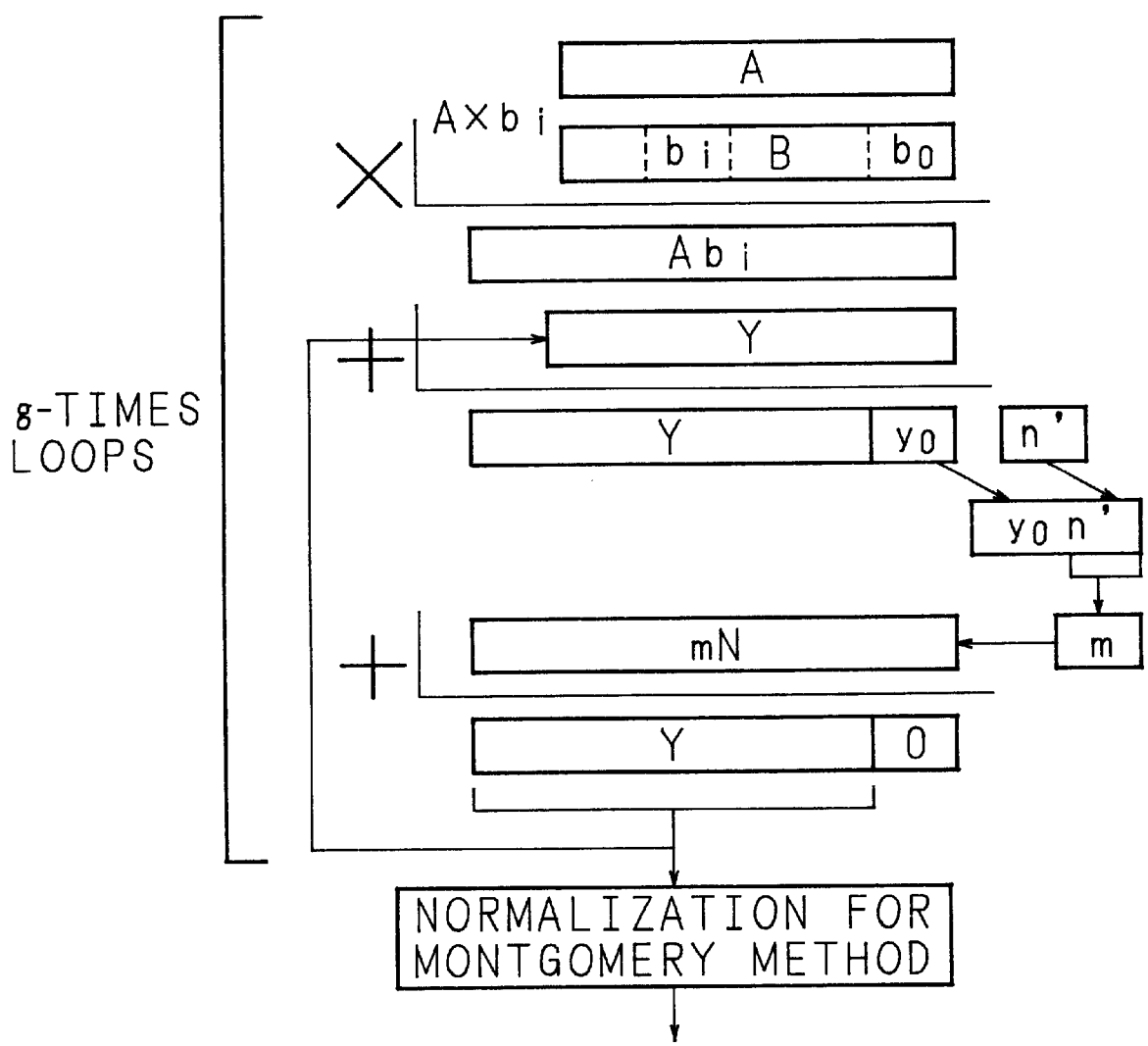
FIG. 2 is a view showing a modular-multiplication process in the prior art.
Figure 3:
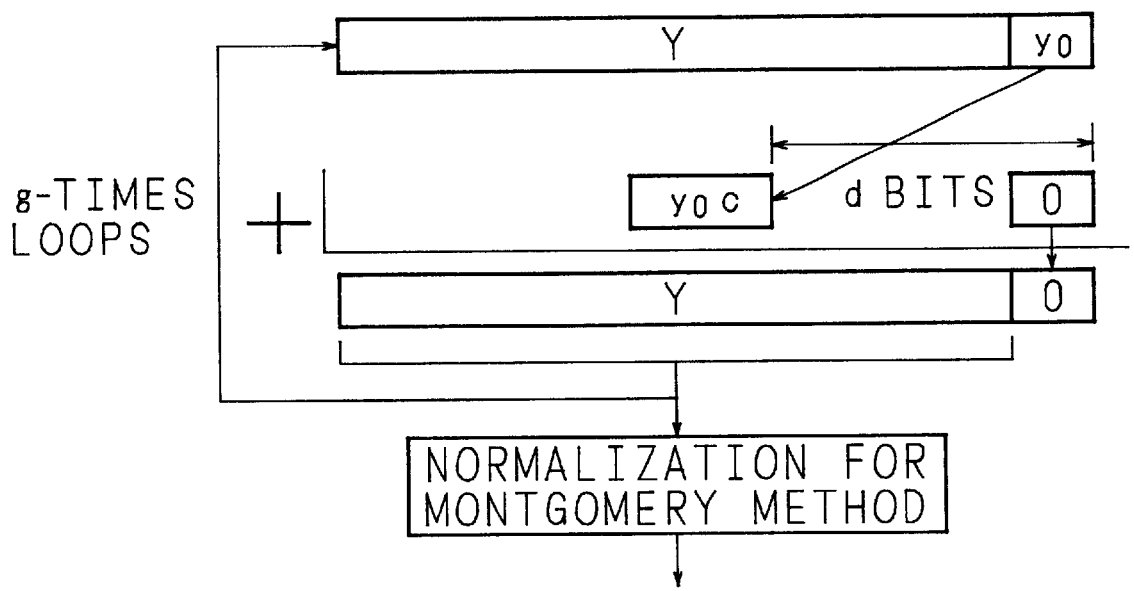
FIG. 3 is a view showing a remainder calculating process in a first remainder calculation (Algorithm 4)
Figure 4:
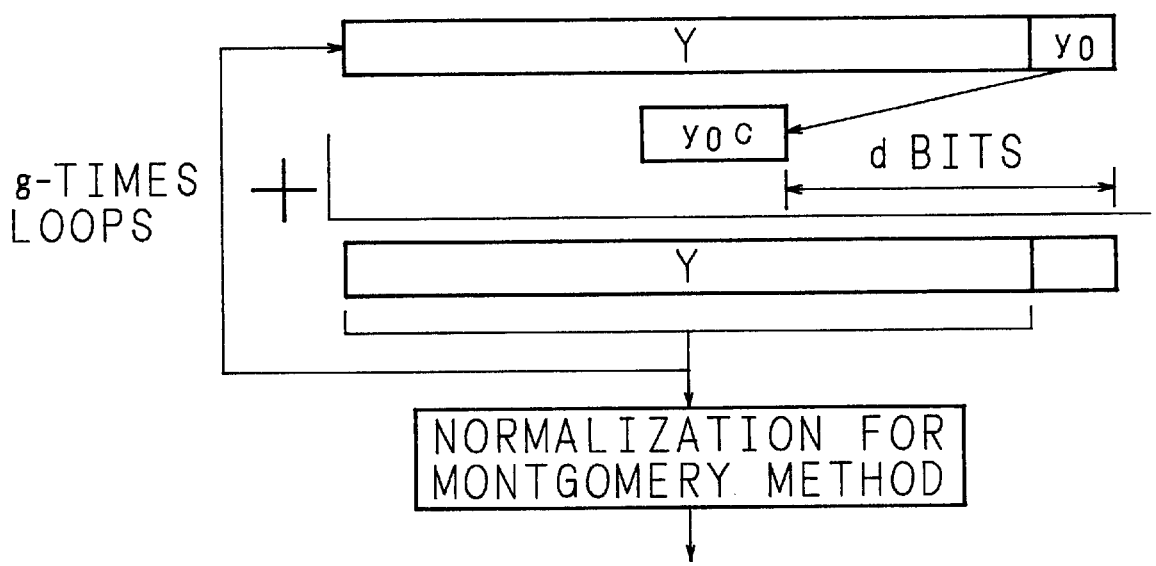
FIG. 4 is a view showing a remainder calculating process in a first remainder calculation (Algorithm 4)

In the case where the condition is expressed as shown above, it is possible to obtain $TR^{-1}$ mod N by the following repetitive processing of j=0 to g-1. FIG. 3 and FIG. 4 are views showing a remainder calculating process by the Algorithm 4. FIG. 4 shows an example in the case where $y_0=0$ process is omitted in FIG. 3.

$Y=T$ for j=0 to g-1

$Y=Y+y_0 c2^d$ $y_0=0$ $Y=Y/r$ next if $Y \geq N$ then $Y=Y-N$ $Y<N$ then return Y In this case, actually, $y_0=y_0-y_0$ process may be carried out, or the $y_0=0$ process may be omitted by carrying out a calculation for obtaining an integer quotient from $Y=Y/r$.

[Second Remainder Calculation]

Figure 5:
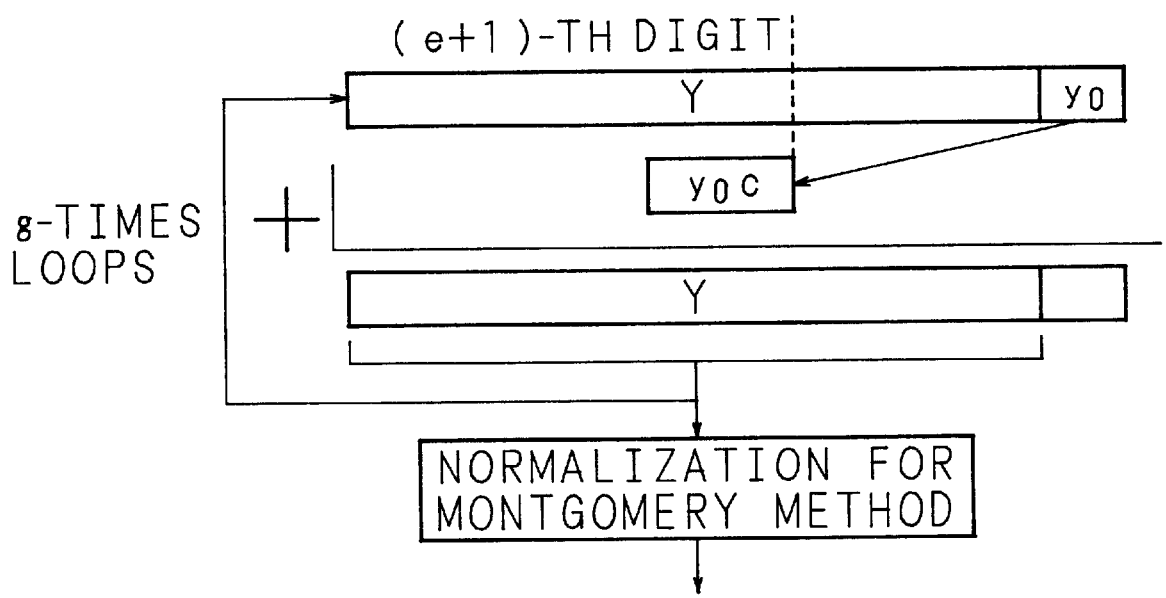
FIG. 5 is a view showing a remainder calculating process in a second remainder calculation (Algorithm 4)

If d in the aforesaid (Algorithm 4) is set as d=ek, the calculation of $Y=Y+y_0 c2^d$ is a process of adding $y_0$ c by the r-adic from a lower (e+1)-th digit (the least digit is set as lower one digit), and therefore, a d-bit shift becomes unnecessary. FIG. 5 shows a remainder calculating process made at this time.

[Third Remainder Calculation]

Assuming that the aforesaid divisor N of (Algorithm 2) is set as $N=c2^d+1$ (($d \geq k$, k: number of bits of processing unit), $c=(c_{q-1}, c_{q-2}, \ldots c_0)_r$), the following effects are obtained. More specifically, 1̂ $m=(r-y_0)$ mod r, and therefore, m is calculated by a subtraction; as a result, a calculation of $n'_0$ is unnecessary; and 2̂ it is possible to replace a calculation of $Y=Y+m \cdot N$ with a calculation of $Y=Y+y_0c2^d+m$.

In comparison with the first remainder calculation, a computational complexity increases by the calculation of m, addition of m and a carrier calculation. However, the computational complexity according to this method is less than the (Algorithm 2). The method is shown as the following (Algorithm 5).

(Algorithm 5)

Figure 6:
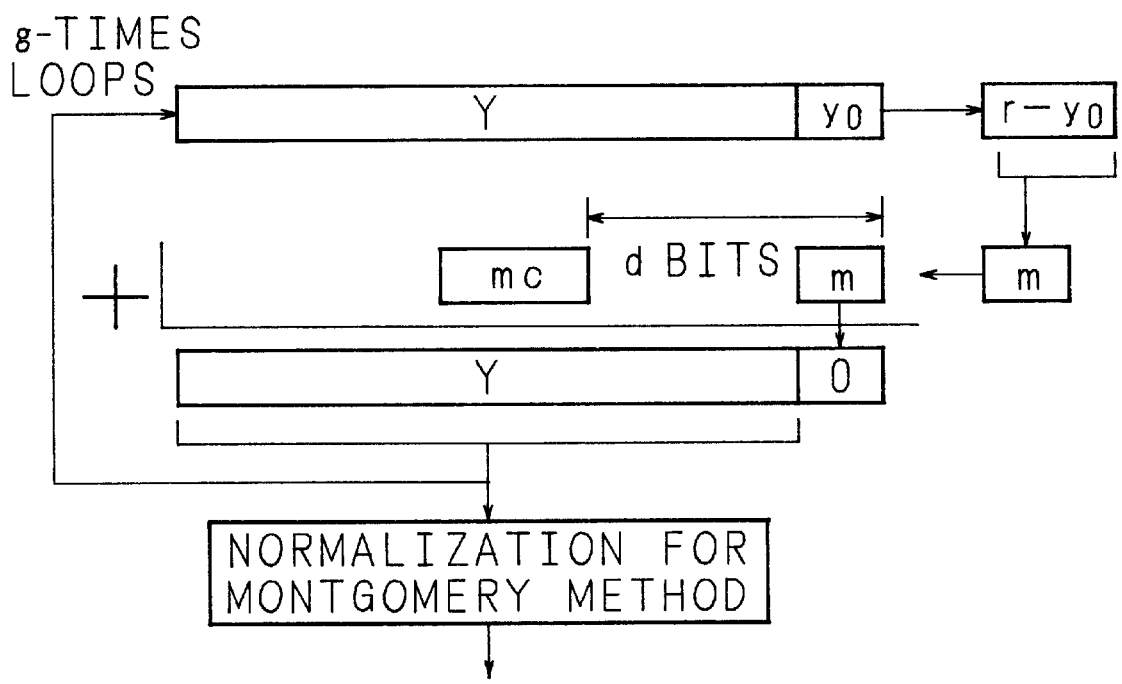
FIG. 6 is a view showing a remainder calculating process in a third remainder calculation (Algorithm 5)

A dividend T, a parameter N' and an output variable Y are all r-adic, and $T=(t_{2g-1}, t_{2g-2}, \ldots, t_0)_r$, $N'=(n'_{g-1}, n'_{g-2}, \ldots, n'_0)_r$, $Y=(y_q, y_{q-1}, \ldots, y_0)_r$, $R=r^g$, $r=2^k$, $N=c2^d+1$, $c=(c_{g-1}, c_{g-2}, \ldots, c_0)_r$, $d \geq k$ In the case where the condition is expressed as shown above, it is possible to obtain $TR^{-1}$ mod N by the following repetitive processing of j=0 to g−1. FIG. 6 is a view showing a remainder calculating process by the Algorithm 5.

$$Y=T$$
$$\text{for } j=0 \text{ to } g-1$$
$$m=(r-y_0) \bmod r$$
$$Y=Y+y_0 c 2^d + m$$
$$Y=Y/r$$

next
if
    $Y \geq N$ then $Y=Y-N$
    $Y<N$ then return Y

[Fourth Remainder Calculation]

Figure 7:
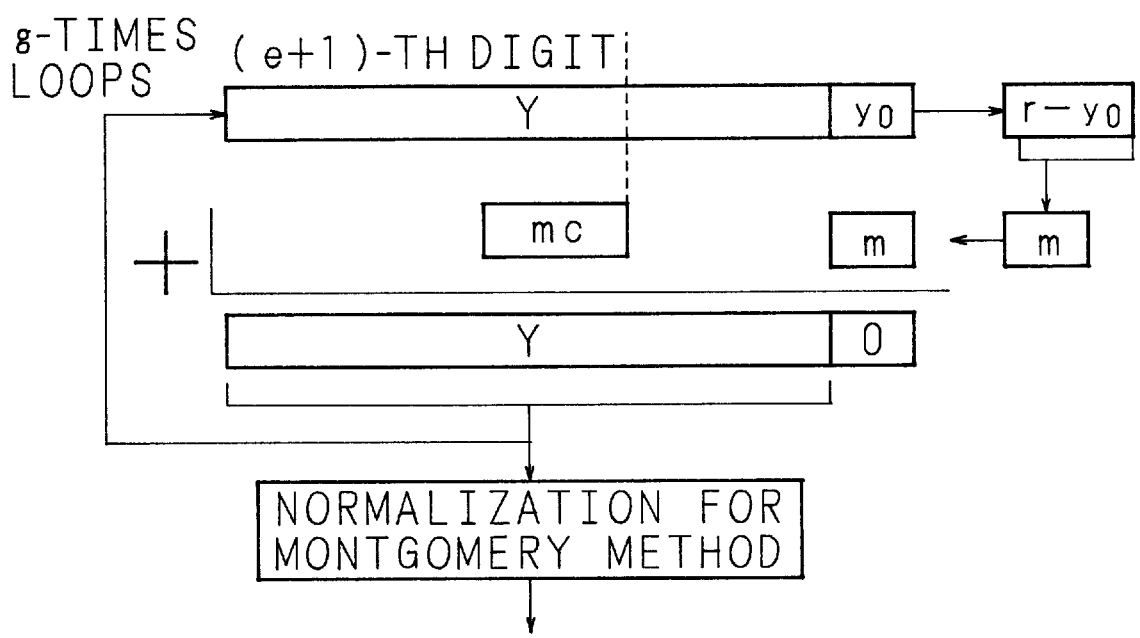
FIG. 7 is a view showing a remainder calculating process in a fourth remainder calculation (Algorithm 5)

If d in the aforesaid (Algorithm 5) is set as d=ek, the addition of $mc2^d$ is a process of adding mc by the r-adic from a lower (e+1)-th digit (the least digit is set as lower one digit), and therefore, a d-bit shift becomes unnecessary. FIG. 7 shows a remainder calculating process made at this time.

[First Modular-multiplication]

Like the first remainder calculation, assuming that the aforesaid divisor N of (Algorithm 3) is set as $N=c2^d-1$ (d≧k, k: number of bits of processing unit), the same effects as the first remainder calculation are obtained. This method is shown as the following (Algorithm 6).

(Algorithm 6)

Two multipliers A and B, a parameter N' and an output variable Y are all r-adic, and $$A=(a_{g-1}, a_{g-2}, \ldots, a_0)_r,$$
$$B=(b_{g-1}, b_{g-2}, \ldots, b_0)_r,$$
$$N'=(n'_{g-1}, n'_{g-2}, \ldots, n'_0)_r,$$
$$Y=(y_g, y_{g-1}, \ldots, y_0)_r,$$
$$R=r^g,$$
$$r=2^k,$$
$$N=c2^d-1,$$
$$c=(c_{q-1}, c_{q-2}, \ldots, c_0)_r,$$
$$d \geq k$$

Figure 8:
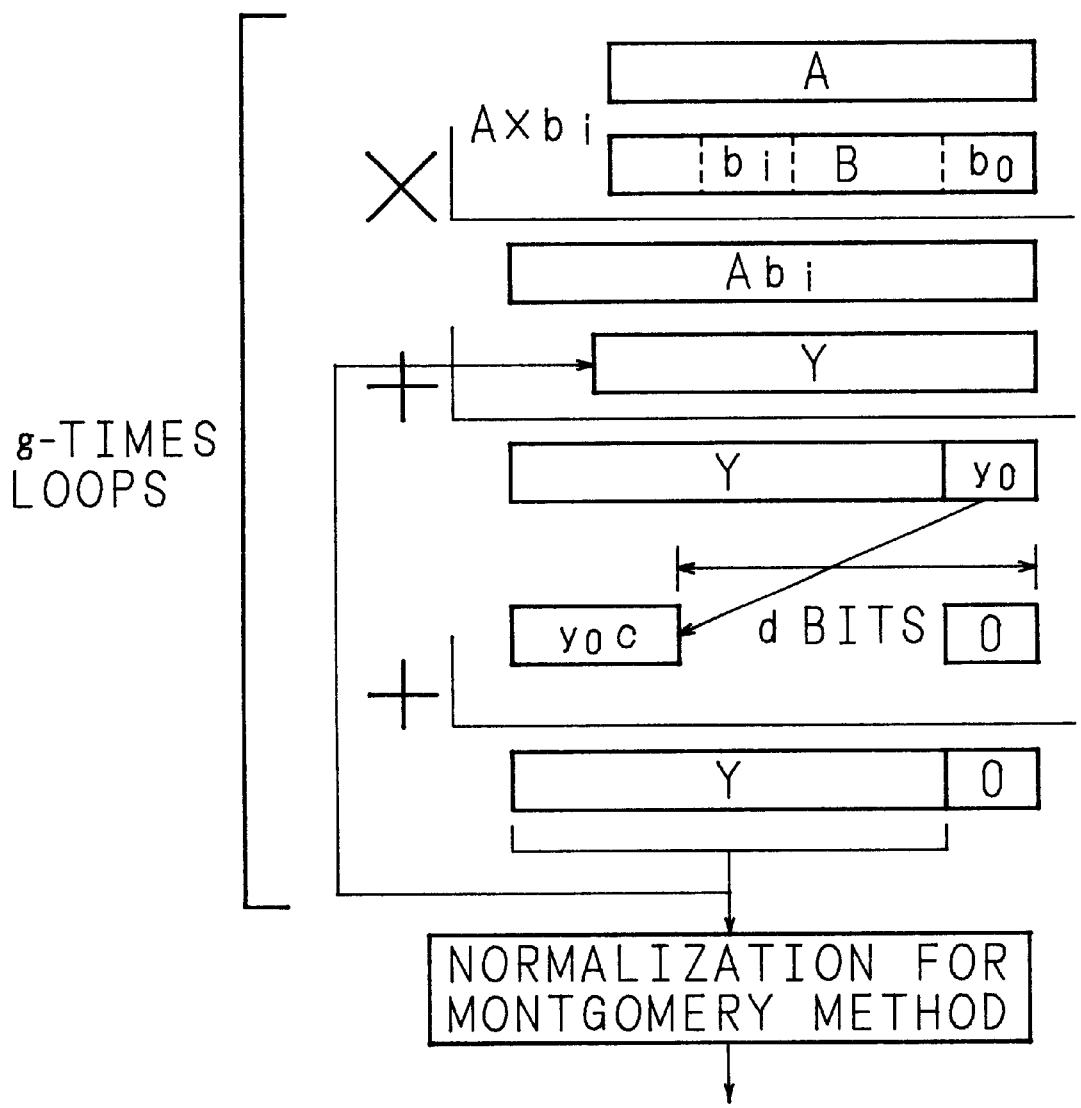
FIG. 8 is a view showing a modular-multiplication process in a first modular-multiplication (Algorithm 6)
Figure 9:
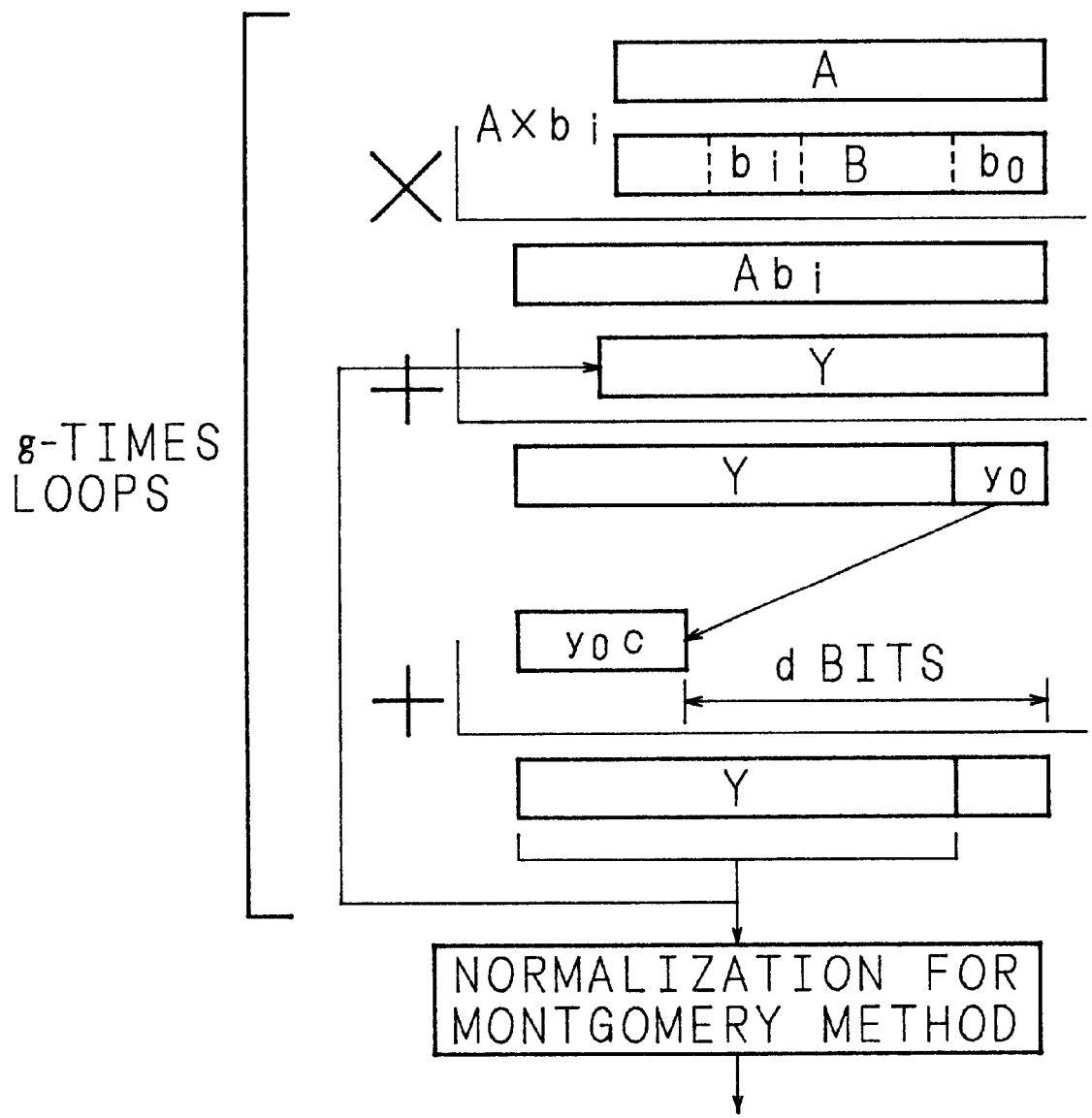
FIG. 9 is a view showing a modular-multiplication process in a first modular-multiplication (Algorithm 6)

In the case where the condition is expressed as shown above, it is possible to obtain $ABR^{-1}$ mod N by the following repetitive processing of j=0 to g−1. FIG. 8 and FIG. 9 are views showing a modular-multiplication process by the Algorithm 6. FIG. 9 shows an example in the case where $y_0=0$ process is omitted in FIG. 8.

$$Y=0$$
$$\text{for } j=0 \text{ to } g-1$$
$$Y=Y+A \cdot b_j$$
$$Y=Y+y_0 c 2^d$$
$$y_0=0$$
$$Y=Y/r$$

next
if
    $Y \geq N$ then $Y=Y=N$
    $Y<N$ then return Y

In this case, actually, $y_0=y_0-y_0$ process may be carried out, or the $y_0=0$ process may be omitted by carrying out a calculation for obtaining an integer quotient from Y=Y/r.

[Second Modular-multiplication]

Figure 10:
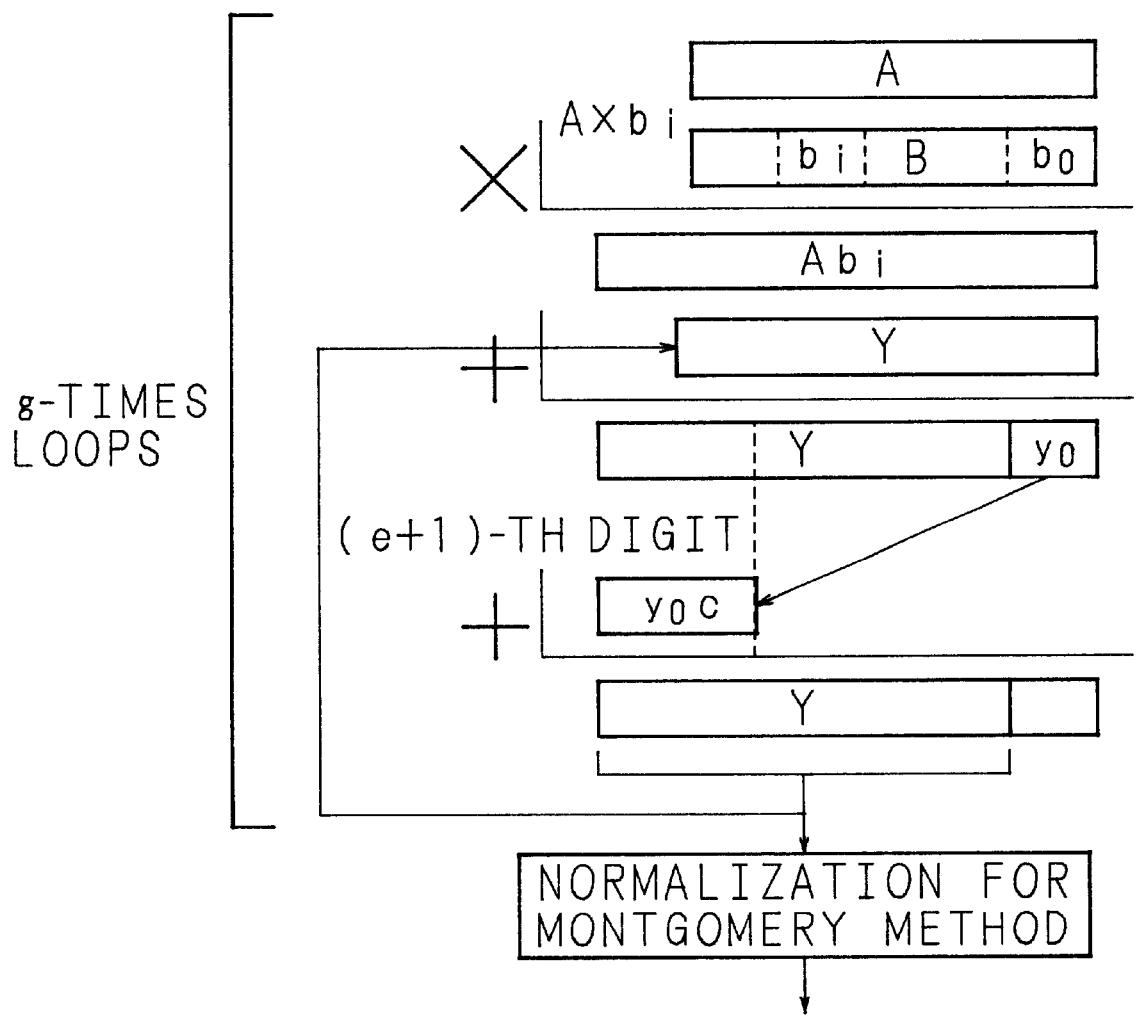
FIG. 10 is a view showing a modular-multiplication process in a second modular-multiplication (Algorithm 6)

Like the second remainder calculation, if d in the aforesaid (Algorithm 6) is set as d=ek, the calculation of $Y=Y+y_0 c 2^d$ is a process of adding $y_0 c$ by the r-adic from a lower (e+1)-th digit (the least digit is set as lower one digit), and therefore, a d-bit shift becomes unnecessary. FIG. 10 shows a modular-multiplication process made at this time.

[Third Modular-multiplication]

Like the third remainder calculation, assuming that the aforesaid divisor N of (Algorithm 3) is set as $N=c2^d+1$ (d≧k, k: number of bits of processing unit), the same effects as the third remainder calculation are obtained. This method is shown as the following (Algorithm 7).

(Algorithm 7)

Two multipliers A and B, a parameter N' and an output variable Y are all r-adic, and $$A=(a_{g-1}, a_{g-2}, \ldots, a_0)_r,$$
$$B=(b_{g-1}, b_{g-2}, \ldots, b_0)_r,$$
$$N'=(n'_{g-1}, n'_{g-2}, \ldots, n'_0)_r,$$
$$Y=(y_g, y_{g-1}, \ldots, y_0)_r,$$
$$R=r^g,$$
$$r=2^k,$$
$$N=c2^d+1,$$
$$c=(c_{q-1}, c_{q-2}, \ldots, c_0)_r,$$
$$d \geq k$$

Figure 11:
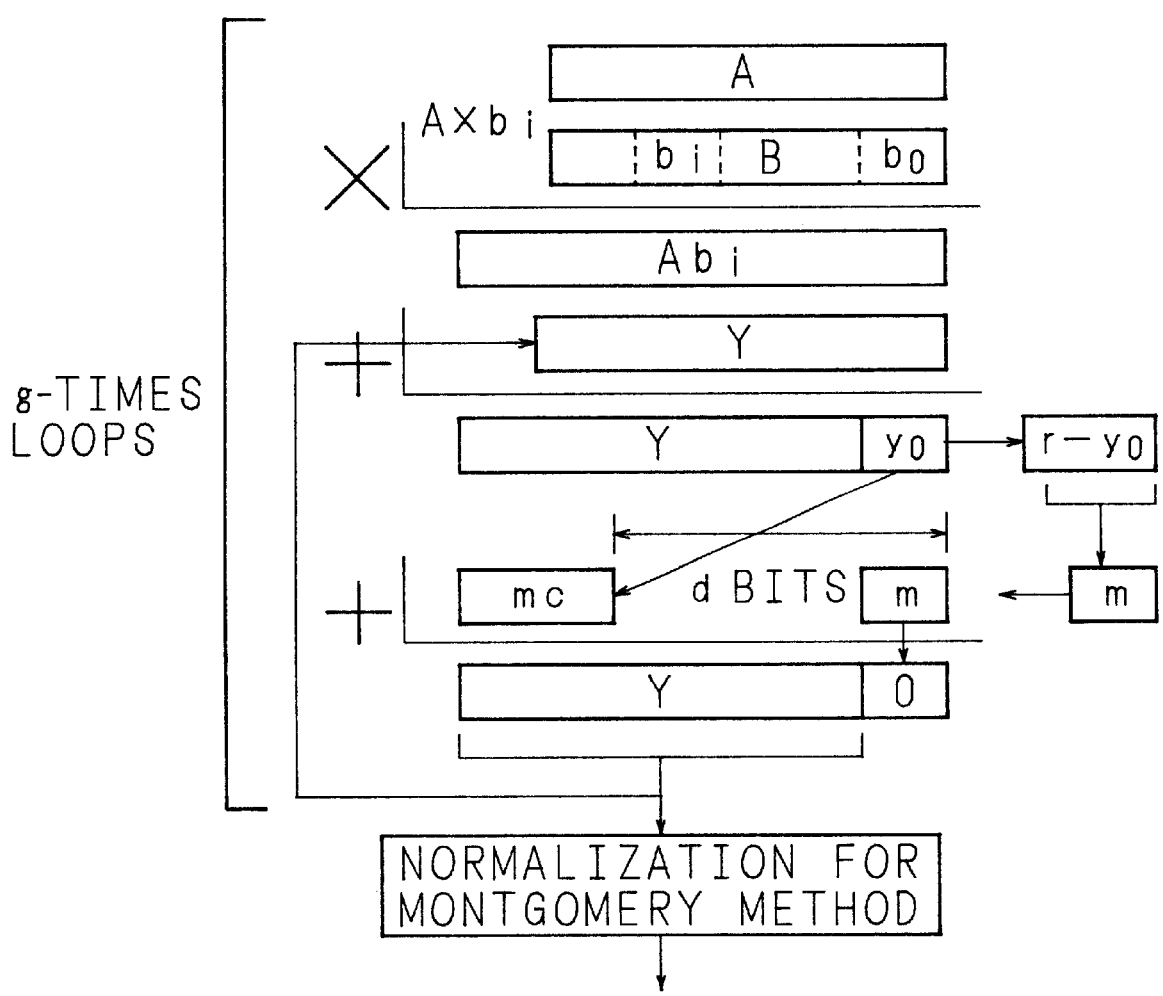
FIG. 11 is a view showing a modular-multiplication process in a third modular-multiplication (Algorithm 7)

In the case where the condition is expressed as shown above, it is possible to obtain $ABR^{-1}$ mod N by the following repetitive processing of j=0 to g−1. FIG. 11 is a view showing a modular-multiplication process by the Algorithm 7.

$$Y=0$$
$$\text{for } j=0 \text{ to } g-1$$
$$Y=Y+A \cdot b_j$$
$$m=(r-y_0) \bmod r$$
$$Y=Y+mc2^d+m$$
$$Y=Y/r$$

next
if
    $Y \geq N$ then $Y=Y-N$
    $Y<N$ then return Y

[Fourth Modular-multiplication]

Figure 12:
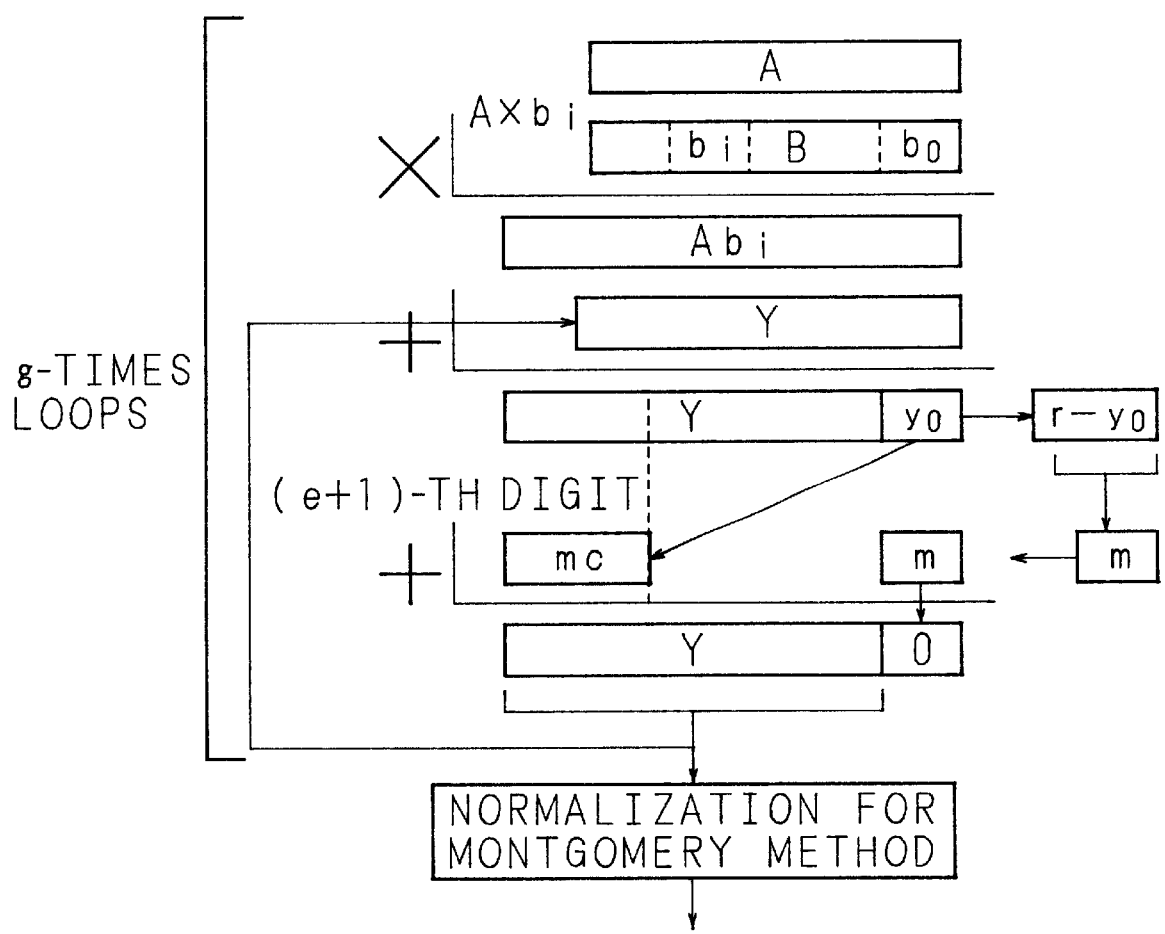
FIG. 12 is a view showing a modular-multiplication process in a forth modular-multiplication (Algorithm 7)

Like the fourth remainder calculation, if d in the aforesaid (Algorithm 7) is set as d=ek, the addition of $mc2^d$ is a process of adding mc by the r-adic from a lower (e+1)-th digit (the least digit is set as lower one digit), and therefore, a d-bit shift becomes unnecessary. FIG. 12 shows a modular-multiplication process made at this time.

Embodiments of the present invention will be detailedly described below.

[Embodiment 1: Remainder Calculation]

Figure 13:
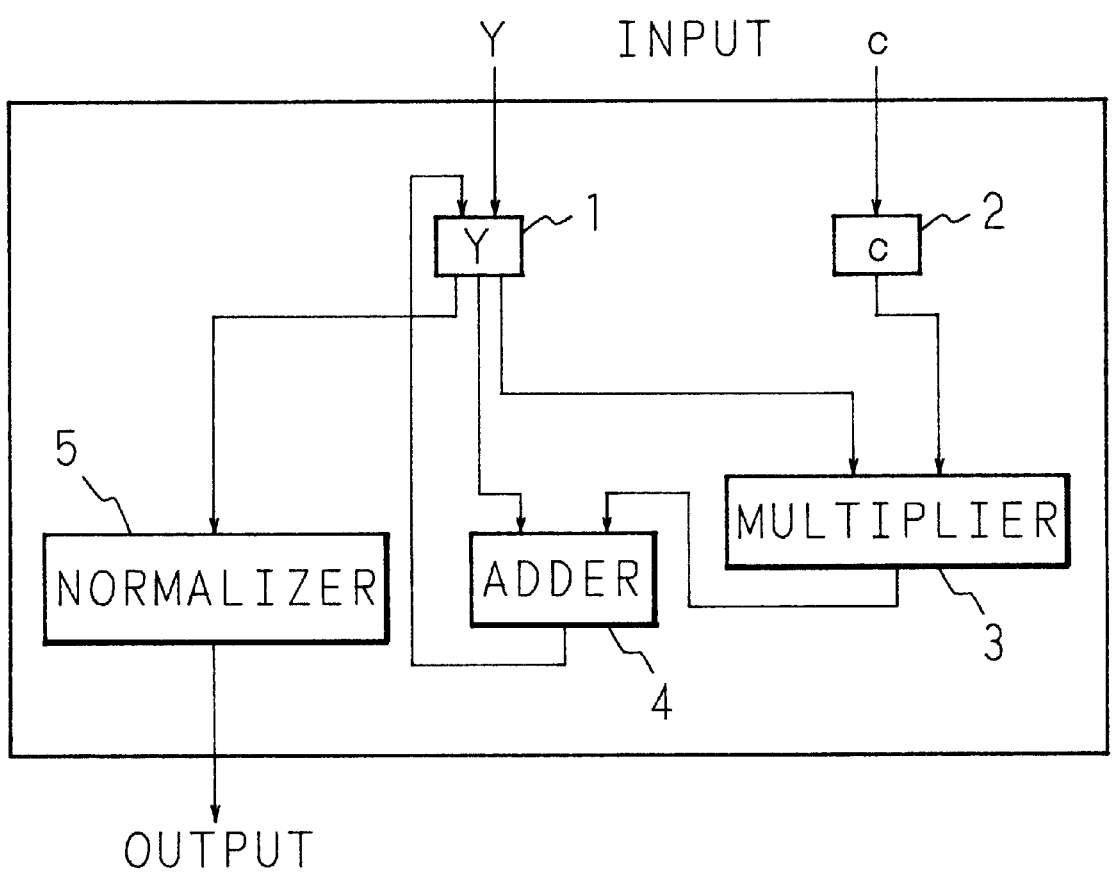
FIG. 13 is a view showing a construction of a remainder calculating apparatus according to the present invention.

FIG. 13 is a view showing a construction of a remainder calculating apparatus according to the present invention.

The remainder calculating apparatus shown in FIG. 13 comprises: a Y-register 1 which stores a value of a variable $Y=(Y_g, Y_{g-1}, \ldots, y_0)_r$ used as a dividend; a c-register 2 which stores a value of $c=(c_{q-1}, c_{q-2}, \ldots, c_0)_r$; a multiplier 3 which obtains a product of a least digit value $y_0$ of the variable Y and c; an adder 4 which adds an output (multiplicative result) of the multiplier 3 and an output (higher digit) of the Y-register 1 together; and a normalizer 5 which makes a normalization for Montgomery method.

Figure 14:
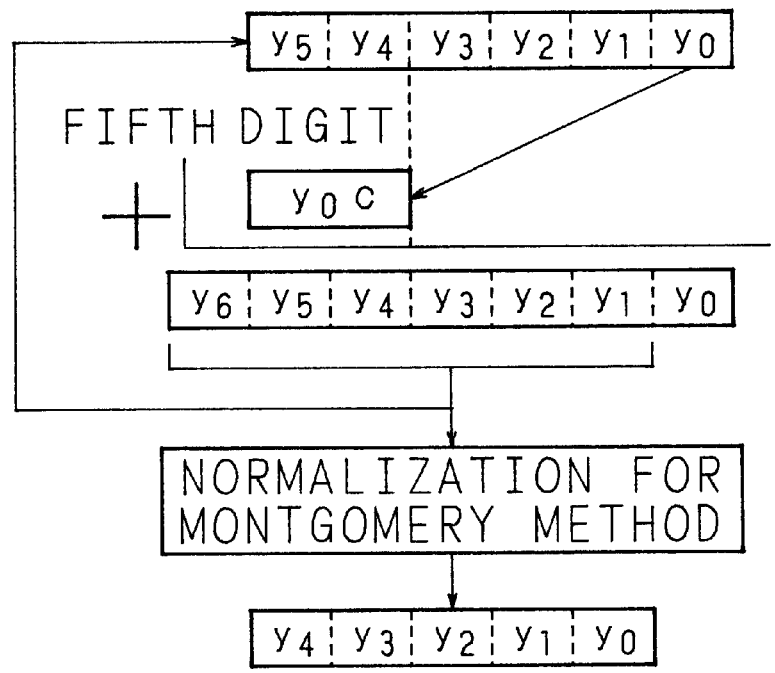
FIG. 14 is a view showing a remainder calculating process by the remainder calculating apparatus according to the present invention.
Figure 15:
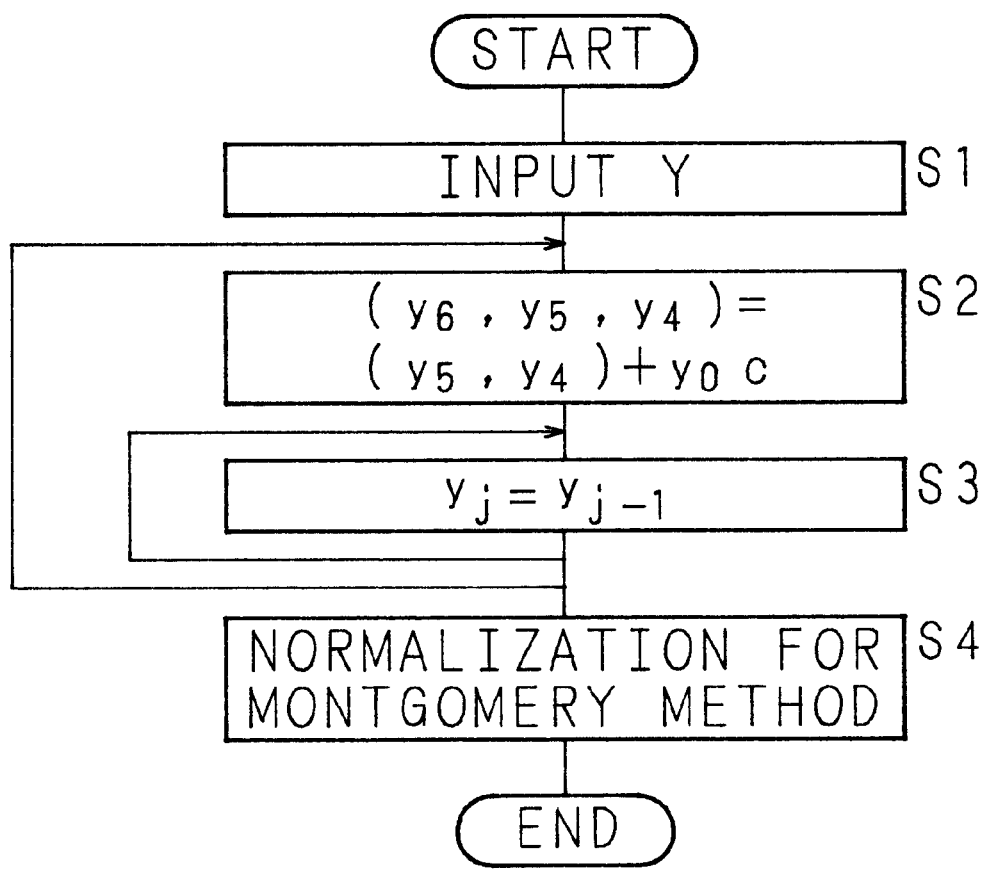
FIG. 15 is a flowchart showing an operation procedure in the remainder calculating apparatus according to the present

FIG. 14 is a view showing a remainder calculating process by the remainder calculating apparatus, and FIG. 15 is a flowchart showing an operation procedure in the remainder calculating apparatus. Incidentally, the following is an example corresponding to the aforesaid second remainder calculation using the Algorithm 4 (divisor N is set as $N=c2^d-1$, d=ek), and more specifically, g=5, and e=4.

An initial value of the variable Y (a dividend for remainder calculation) is inputted (step S1). Then, the following processes are repeated five times. More specifically, the processes include: a process (step S2) for obtaining yoc by means of the multiplier 3, and adding the multiplicative value and $(y_5, y_4)$ by means of the adder 4, and thus, storing the additive result in $(y_6, y_5, y_4)$ of the Y-register 1; and a process (step S3) for transferring $(y_6, y_5, y_4, y_3, y_2, y_1)$ to $(y_5, y_4, y_3, y_2, y_1, y_0)$ in the Y-register 1. Finally, a process for Montgomery normalization is carried out (step S4). According to the aforesaid processings, it is possible to calculate $TR^{-1}$ mod N. Then, with the use of a product of the $TR^{-1}$ mod N thus obtained and a previously obtained $R^2$ mod N, the REDC is again carried out, and thereby, a remainder T mod N can be obtained.

[Embodiment 2: Modular-multiplication]

Figure 16:
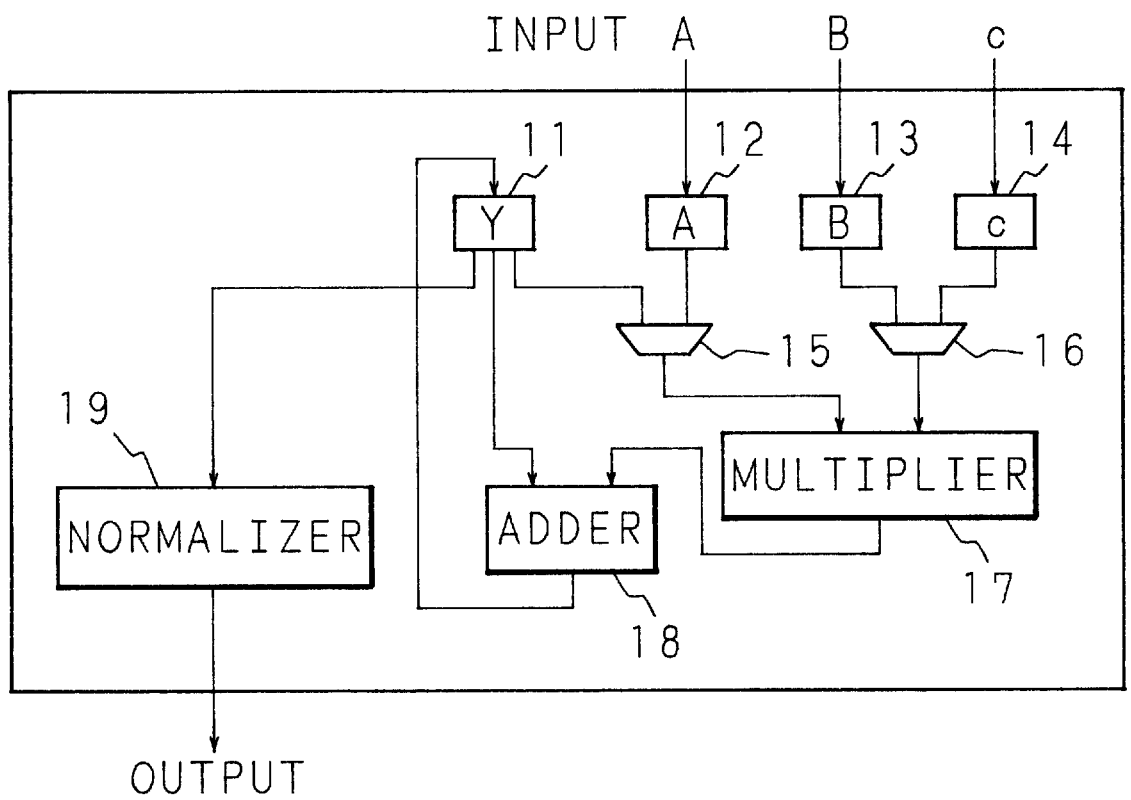
FIG. 16 is a view showing a construction of a modular-multiplication apparatus according to the present invention.

FIG. 16 is a view showing a construction of a modular-multiplication apparatus according to the present invention. The modular-multiplication apparatus shown in FIG. 16 comprises: a Y-register 11 which stores a value of a variable $Y=(y_g, y_{g-1}, \ldots, y_0)_r$ used as a dividend; an A-register 12 which stores a value of one multiplier $A=(a_{g-1}, a_{g-2}, \ldots, a_0)_r$, a B-register 13 which stores a value of the other multiplier $B=(b_{g-1}, b_{g-2}, \ldots, b_0)_r$, a c-register 14 which stores a value of $c=(C_{q-1}, c_{q-2}, \ldots, c_0)_r$; a selector circuit 15 which selects an input from either the Y-register 11 or the A-register 12 and outputs the selected input; a selector circuit 16 which selects an input from either the B-register 13 or the c-register 14 and outputs the selected input; a multiplier 17 which multiplies an output from the selector circuit 15 and an output from the selector circuit 16; an adder 18 which adds an output (multiplicative result) of the multiplier 17 and an output (higher digit) of the Y-register 11 together; and a normalizer 19 which makes a normalization for Montgomery method.

Figure 17:
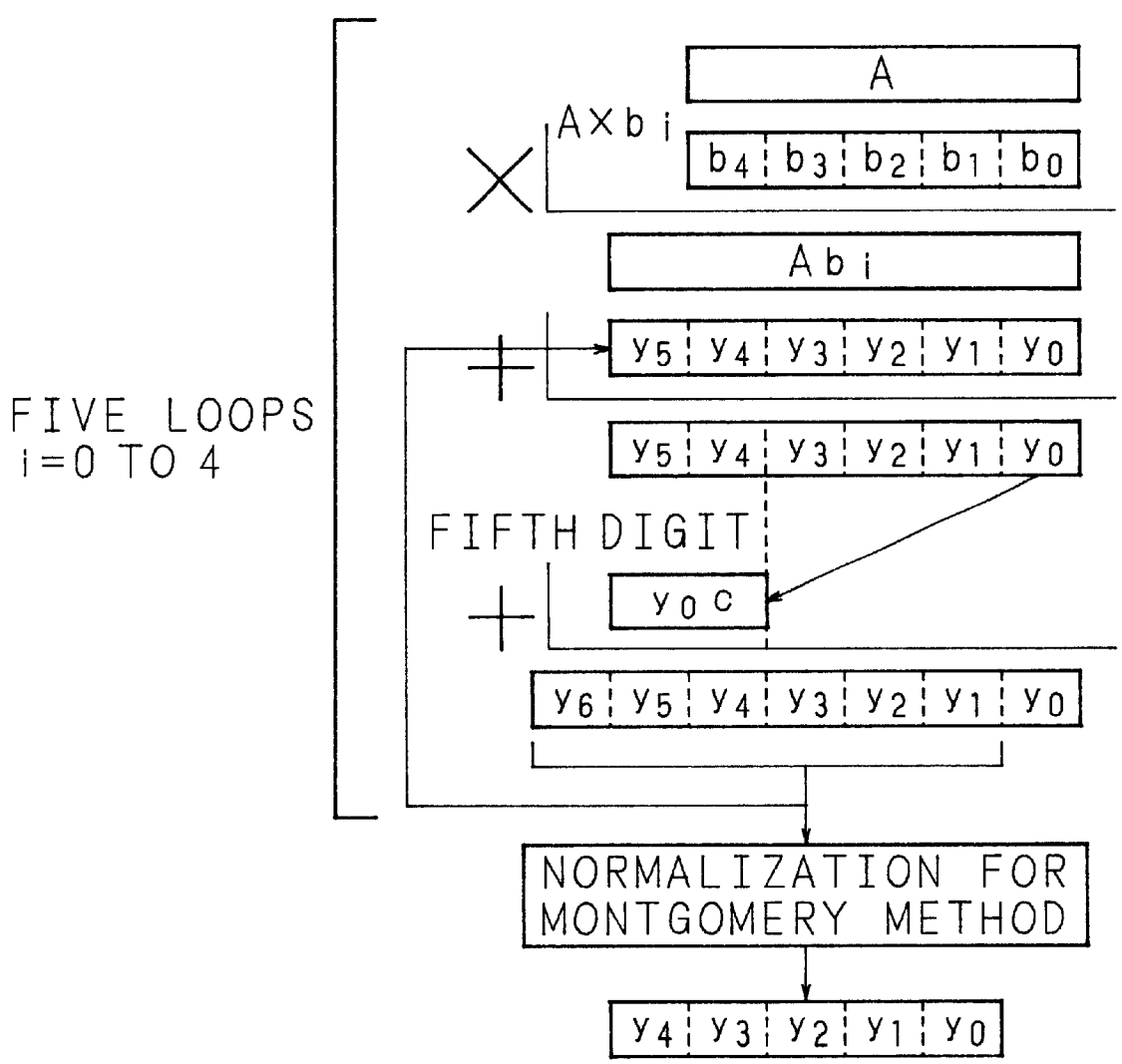
FIG. 17 is a view showing a modular-multiplication process by the modular-multiplication apparatus according to the present invention.
Figure 18:
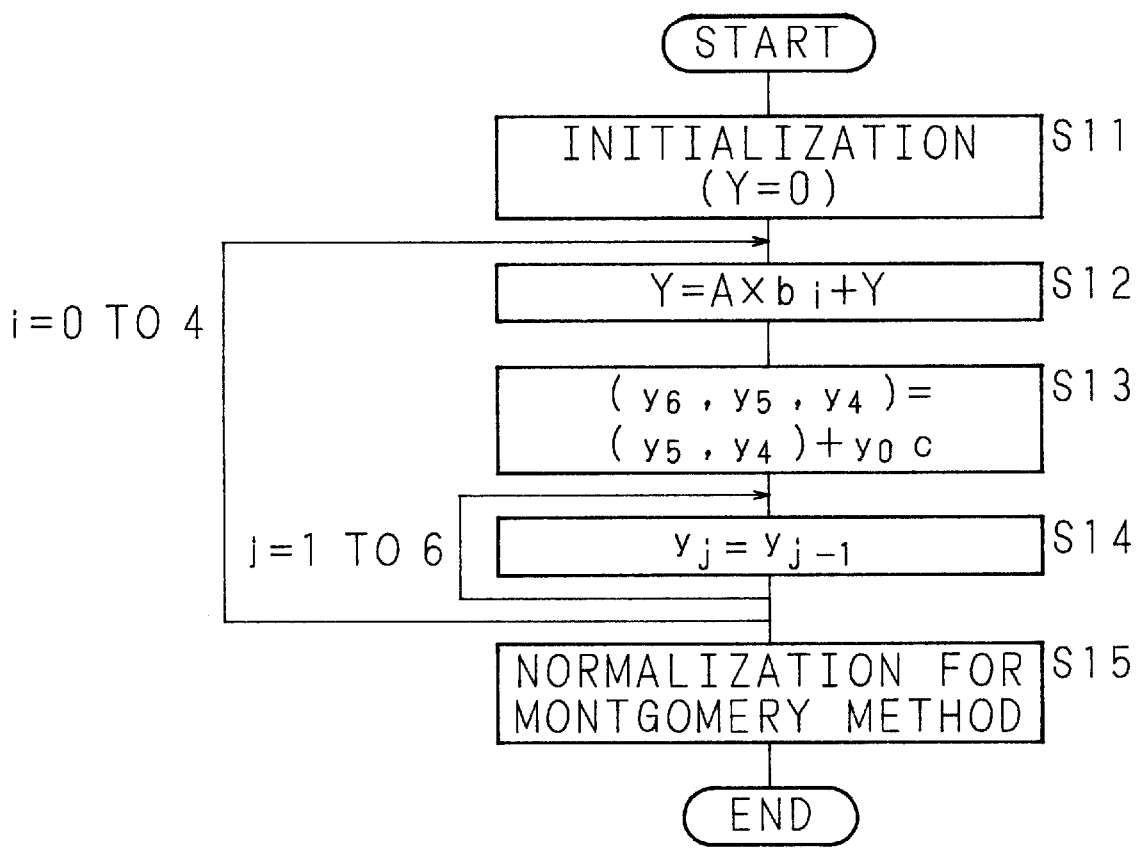
FIG. 18 is a flowchart showing an operation procedure in the modular-multiplication apparatus according to the present invention.

FIG. 17 is a view showing a modular-multiplication process by the modular-multiplication apparatus, and FIG. 18 is a flowchart showing operation procedures in the modular-multiplication apparatus. Incidentally, the following is an example corresponding to the aforesaid second modular-multiplication using the Algorithm 6 (divisor N is set as $N=c2^d-1$, d=ek), and more specifically, g=5, and e=4. Moreover, the following data are set as a numerical value of other parameters; more specifically, A: 160 bits, B: 160 bits, N: 160 bits, c: 32 bits, $N=c2^{128}-1$, k=32, d=128, $r=2^{32}$, and $R=2^{160}$.

For initialization, a variable Y (Y: 192 bits) is zero-cleared (step S11). Then, the following processes are repeated five times, that is, when i=0 to 4. More specifically, the processes include: a process (step S12) for obtaining a partial product A×bi by means of the multiplier 17, and adding the multi-plicative result to the variable Y; a process (step S13) for obtaining $y_0c$ by means of the multiplier 17, adding the multiplicatve result and $(y_5, y_4)$ by means of the adder 18, and storing the additive result in $(y_6, y_5, y_4)$ of the Y-register 11; and a process (step S14) for transferring $(y_6, y_5, y_4, y_3, y_2, y_1)$ to $(y_5, y_4, y_3, y_2, y_1, y_0)$ in the Y-register 11. Finally, a process for Montgomery normalization is carried out (step S15). According to the aforesaid processings, it is possible to calculate REDC (A, B, N, R)=$ABR^{-1}$ mod N. Then, with the use of a product of the $ABR^{-1}$ mod N thus obtained and a previously obtained $R^2$ mod N, the REDC is again carried out, and thereby, a remainder A·B mod N can be obtained.

(Embodiment 3: Recording Medium)

Figure 19:
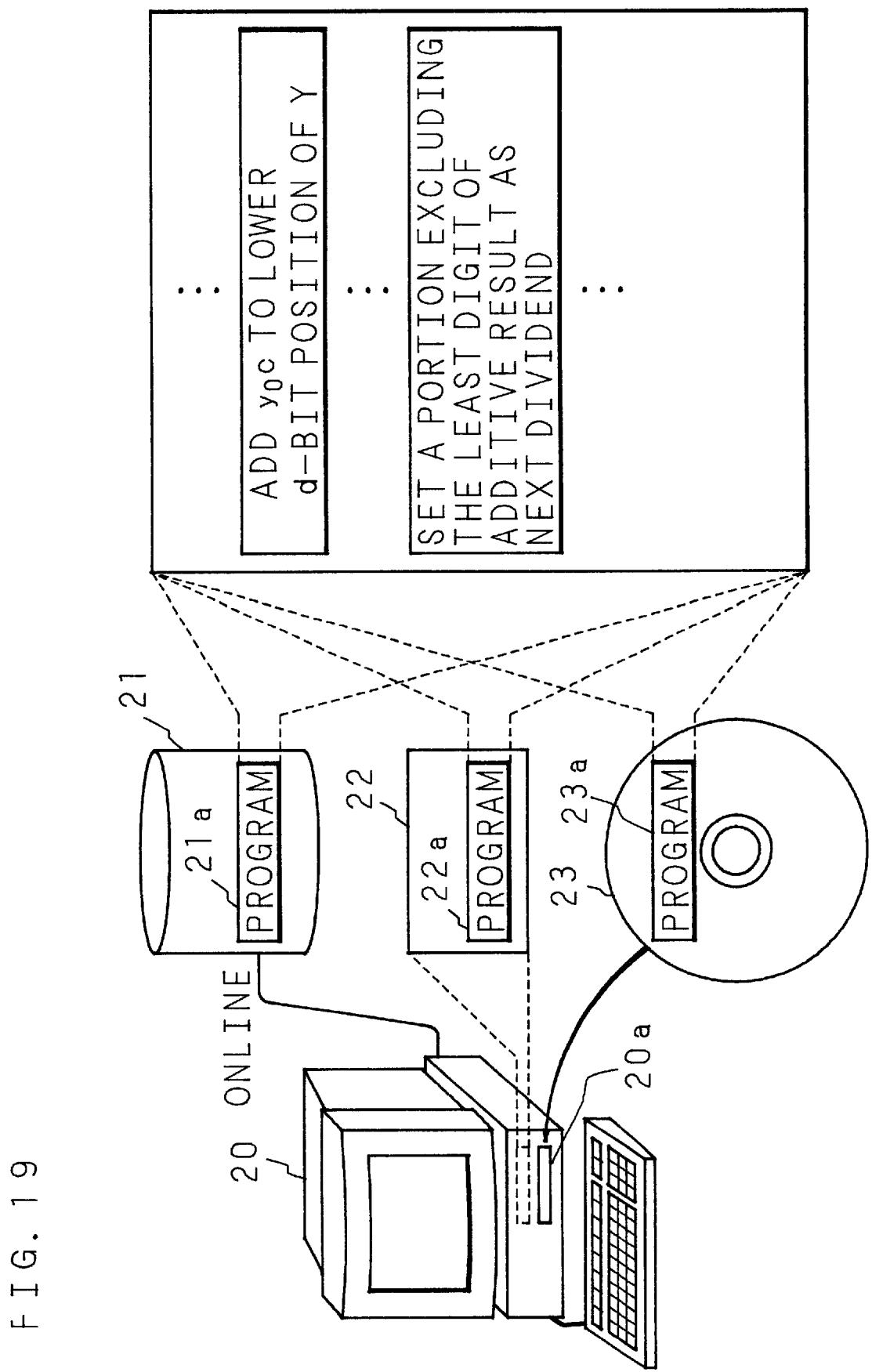
FIG. 19 is a block diagram showing a construction of a recording medium (first remainder calculation: Algorithm 4) according to the present invention.

FIG. 19 is a block diagram showing a construction of a recording medium (first remainder calculation: Algorithm 4) according to the present invention. In FIG. 19, a recording medium 21 is connected in online with a computer 20, and comprises, for example, a WWW (World Wide Web) server computer which is located far from a position where the computer 20 is located. Further, the recording medium 21 records a program 21a which will be described later. The program 21a read from the recording medium 21 controls the computer 20 so that the computer 20 carries out a predetermined calculation.

A recording medium 22 incorporated in the computer 20 comprises a built-in hard disk drive or ROM (Read Only Memory). Further, the recording medium 22 records a program 22a which will be described later. The program 22a read from the recording medium 22 controls the computer 20 so that the computer 20 carries out a predetermined calculation.

A recording medium 23 is used in a state of being loaded in a disk drive 20a of the computer 20. The recording medium 23 comprises, for example, a portable magnet-optical disc, CD-ROM or flexible disk. Further, the recording medium 23 records a program 23a which will be described later. The program 23a read from the recording medium 23 controls the computer 20 so that the computer 20 carries out a predetermined calculation.

The programs 21a, 22a or 23a recorded in the recording medium 21, 22 or 23 shown in FIG. 19 individually include the following steps. More specifically, the steps include: a step of adding a product of a least digit value $y_0$ of the dividend Y and c to a lower d-bit position of the dividend Y; and a step of using a portion excluding the least digit of the additive result as a next dividend.

Figure 20:
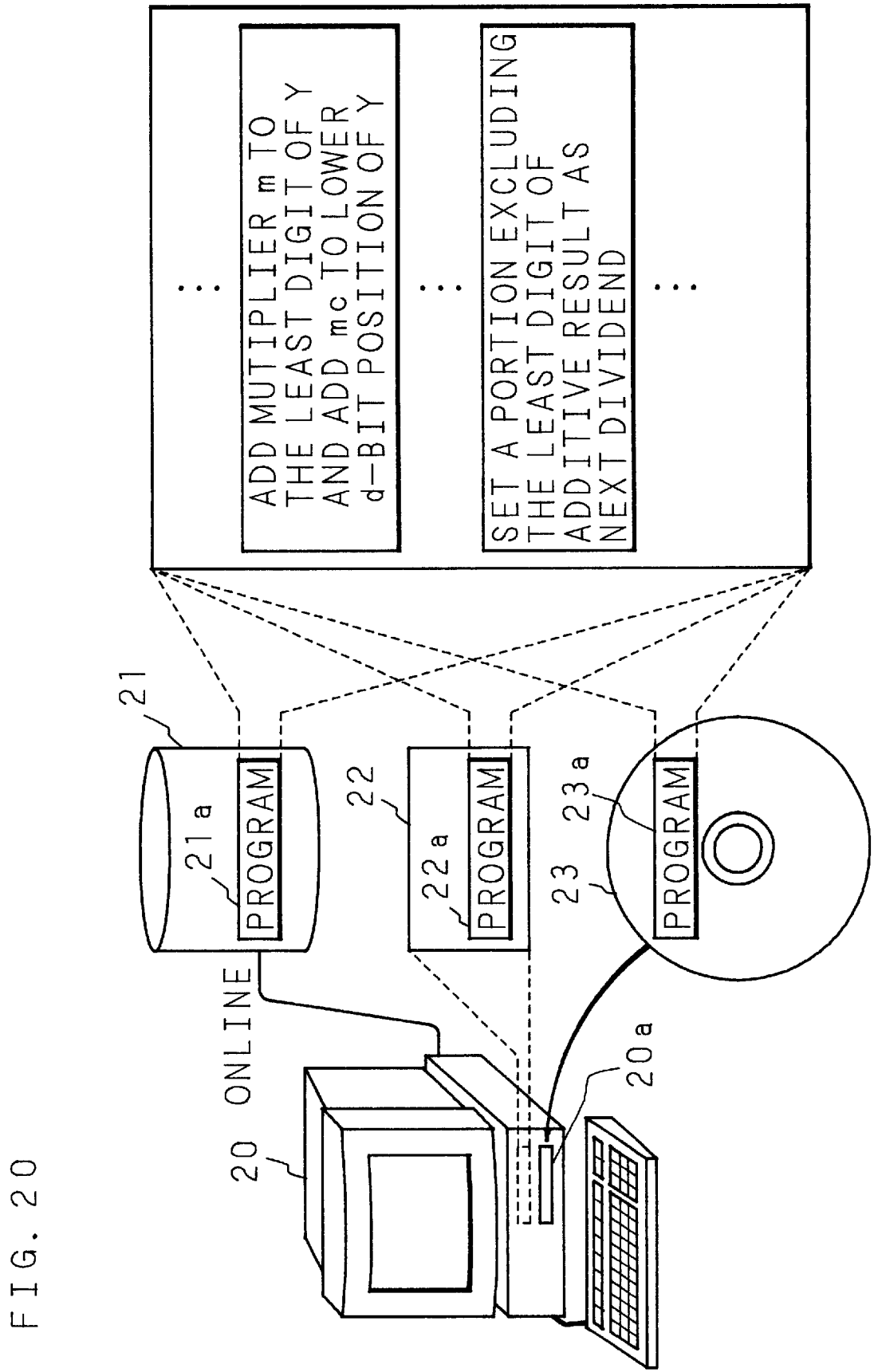
FIG. 20 is a block diagram showing a construction of a recording medium (third remainder calculation: Algorithm 5) according to the present invention.

FIG. 20 is a block diagram showing a construction of a recording medium (third remainder calculation: algorithm 5) according to the present invention. The programs 21a, 22a or 23a recorded in the recording medium 21, 22 or 23 shown in FIG. 20 individually include the following steps. More specifically, the steps include: a step of adding a multiplier m to the least digit of the dividend Y and adding a product of the multiplier m and c to a lower d-bit position of the dividend Y, the multiplier m being complement on two of the least digit value yo of the dividend Y; and a step of using a portion excluding the least digit of the additive result as a next dividend.

Figure 21:
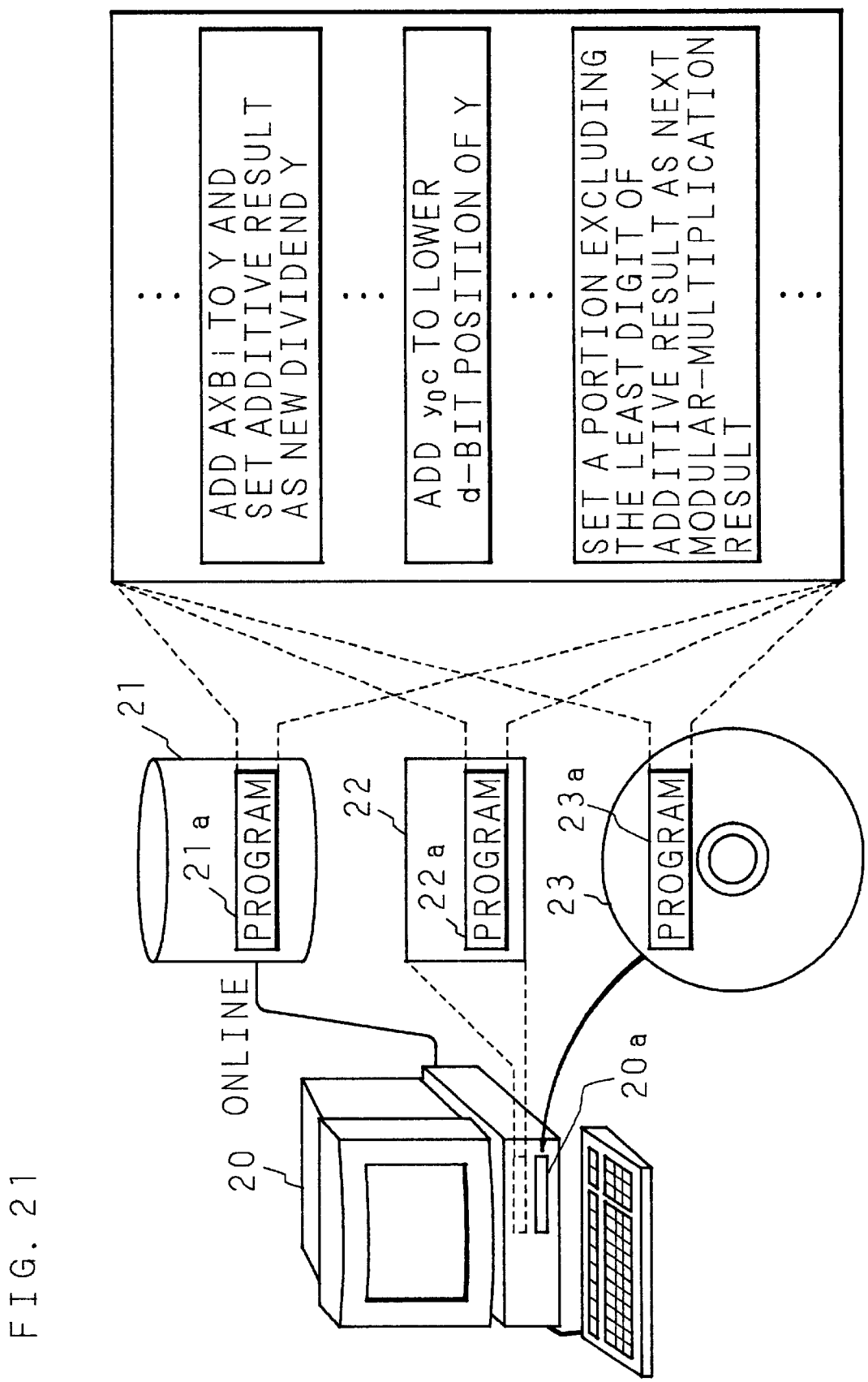
FIG. 21 is a block diagram showing a construction of a recording medium (first modular-multiplication: Algorithm 6) according to the present invention.

FIG. 21 is a block diagram showing a construction of a recording medium (first modular-multiplication: algorithm 6) according to the present invention. The programs 21a, 22a or 23a recorded in the recording medium 21, 22 or 23 shown in FIG. 21 individually include the following steps. More specifically, the steps include: a step of adding a partial multiplication result A×Bi of two numbers A and B and a previous partial modular-multiplication result so as to use the additive result as a new dividend Y; a step of adding a product of the least digit value $y_0$ of the dividend Y and c to a lower d-bit position of the dividend Y; and a step of using a portion excluding the least digit of the additive result as a next dividend.

Figure 22:
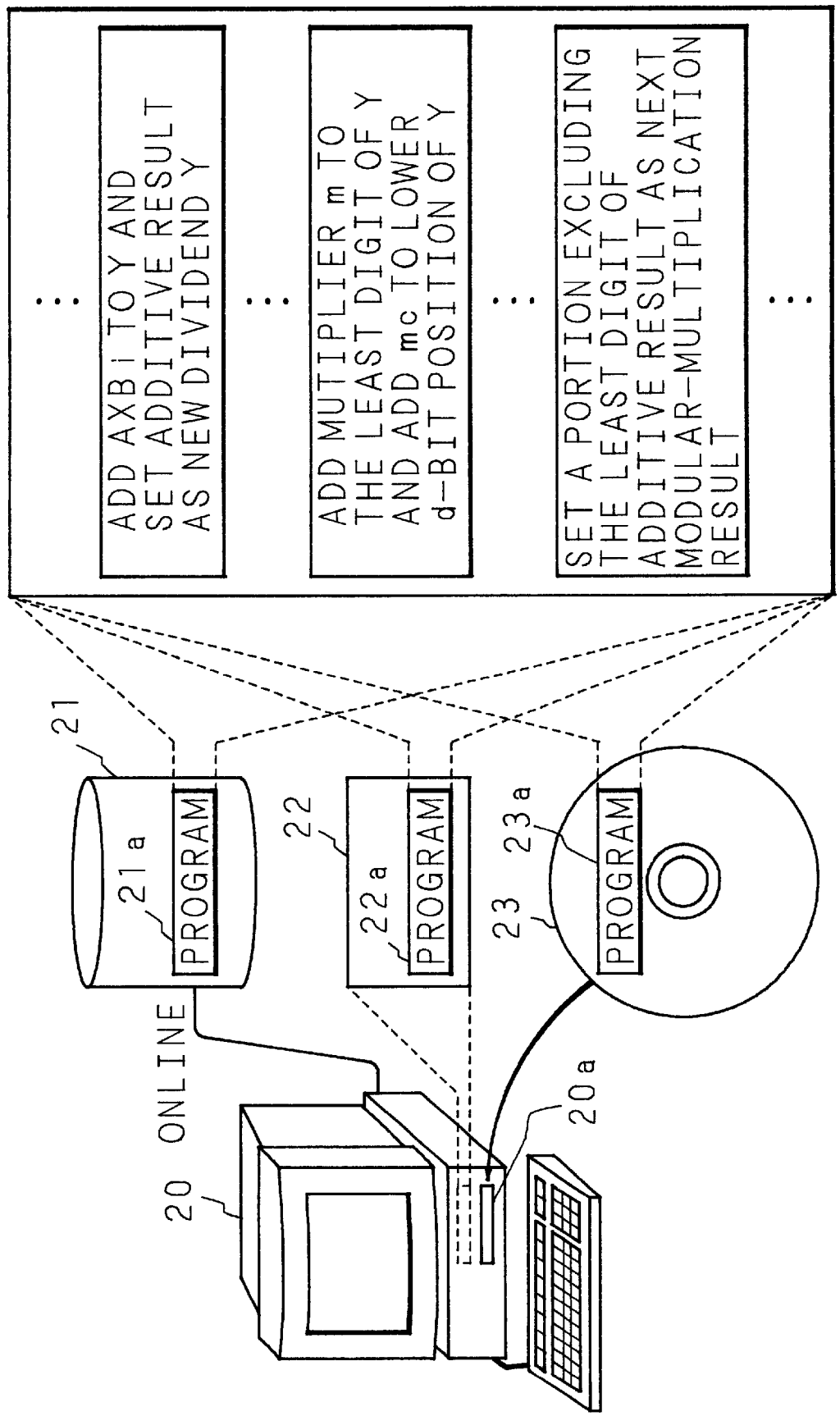
FIG. 22 is a block diagram showing a construction of a recording medium (third modular-multiplication: Algorithm 7) according to the present invention.

FIG. 22 is a block diagram showing a construction of a recording medium (third modular-multiplication: algorithm 7) according to the present invention. The programs 21a, 22a or 23a recorded in the recording medium 21, 22 or 23 shown in FIG. 22 individually include the following steps. More specifically, the steps include: a step of adding a partial multiplication result A×Bi of two numbers A and B and a previous partial modular-multiplication result so as to use the additive result as a new dividend Y; a step of adding a multiplier m to the least digit of the dividend Y and adding a product of the multiplier m and c to a lower d-bit position of the dividend Y, the multiplier m being complement on two of the least digit value yo of the dividend Y; and a step of using a portion excluding the least digit of the additive result as a next dividend.

Now, the following is a description on a comparison between the present invention and the prior art. In the prior art, the specific parameter ($N=\epsilon 2^{L-K}-1$) as described above has been used as the divisor N, and the multiplication of multiple precision×single precision has been carried out two times. On the contrary, in the present invention, the multiplication of multiple precision×single precision is carried out one time; and therefore, it is apparent to reduce a computational complexity. Further, the following data are set as a numerical value of other parameters; more specifically, N: 160 bits, c: 32 bits, d=128, $N=c2^{128}-1$, and the remainder calculating apparatus of the present invention is realized as a software. In the case of executing the software by means of a 32-bits processor, in comparison between the present invention and the prior art, a remainder processing time (a computational complexity) becomes about ⅓ of the prior art using an arbitrary divisor parameter.

As is evident from the above description, according to the remainder calculating method and the modular-multiplication method of the present invention, a number expressed by $N=c2^d\pm 1$ is used as a divisor N; therefore, it is possible to simplify a calculation in Montgomery remainder method and Montgomery modular-multiplication method, and thus, to reduce a computational complexity.

As this invention may be embodied in several forms without departing from the spirit of essential characteristics thereof, the present embodiment is therefore illustrative and not restrictive. Since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A remainder calculating method which calculates a remainder in the case of dividing a dividend Y by a divisor N on the basis of a Montgomery method,
    wherein a number expressed by $N=c2^d-1$ is used as the divisor N, and
    the method includes the following repeatedly carried out steps of:
        a first step of adding a product of a least digit value yo of the dividend Y and c to a lower d-bit position of the dividend Y; and
        a second step of using a portion excluding the least digit of the additive result as a next dividend.

2. The remainder calculating method according to claim 1, wherein the first step includes a process for shifting a product of the least digit value $y_0$ of the dividend Y and c to a higher side by d bits so that the product is added to the dividend Y.

3. A remainder calculating method which calculates a remainder in the case of dividing a dividend Y by a divisor N on the basis of a Montgomery method,
    wherein a number expressed by $N=c2^d-1$ is used as the divisor N, and d is set to e time of k (d=ek), the number of bits of k being one digit, and
    the method includes the following repeatedly carried out steps of:
        a first step of adding a product of a least digit value $y_0$ of the dividend Y and c to a lower (e+1)–digit position of the dividend Y; and
        a second step of using a portion excluding the least digit of the additive result as a next dividend.

4. A remainder calculating method which calculates a remainder in the case of dividing a dividend Y by a divisor N on the basis of a Montgomery method,
    wherein a number expressed by $N=c2^d+1$ is used as the divisor N, and
    the method includes the following repeatedly carried out steps of:
        a first step of adding a multiplier m to the least digit of the dividend Y and adding a product of the multiplier m and c to a lower d-bit position of the dividend Y, the multiplier m being complement on two of the least digit value $y_0$ of the dividend Y; and
        a second step of using a portion excluding the least digit of the additive result as a next dividend.

5. The remainder calculating method according to claim 4, wherein the product of the multiplier m and c is shifted to a higher side by d bits so as to be added to the dividend Y in adding the product of the multiplier m and c to a lower d-bit position of the dividend Y.

6. A remainder calculating method which calculates a remainder in the case of dividing a dividend Y by a divisor N on the basis of a Montgomery method,
    wherein a number expressed by $N=c2^d+1$ is used as the divisor N, and d is set to e time of k (d=ek), the number of bits of k being one digit, and
    the method includes the following repeatedly carried out steps of:
        a first step of adding a multiplier m to the least digit of the dividend Y and adding a product of the multiplier m and c to lower (e+1)–digit position of the dividend Y, the multiplier m being complement on two of the least digit value $y_0$ of the dividend Y; and
        a second step of using a portion excluding the least digit of the additive result as a next dividend.

7. A modular-multiplication method which calculates a remainder in the case of dividing a dividend Y, which is a product of two numbers A and B, by a divisor N on the basis of a Montgomery method,
    wherein a number expressed by $N=c2^d-1$ is used as the divisor N, and
    the method includes the following repeatedly carried out steps of:
        a first step of adding a partial multiplicative result of two numbers A and B and the previous partial modular-multiplication result so as to use the additive result as a new dividend Y;
        a second step of adding a product of a least digit value $y_0$ of the dividend Y and c to a lower d-bit position of the dividend Y; and
        a third step of using a portion excluding the least digit of the additive result as a next modular-multiplication result.

8. The modular-multiplication method according to claim 7, wherein the second step includes a process for shifting a product of the least digit value $y_0$ of the dividend Y and c to a higher side by d bits so that the product is added to the dividend Y.

9. A modular-multiplication method which calculates a remainder in the case of dividing a dividend Y, which is a product of two numbers A and B, by a divisor N on the basis of a Montgomery method, wherein a number expressed by $N=c2^d-1$ is used as the divisor N, and d is set to e time of k (d=ek), the number of bits of k being one digit, and the method includes the following repeatedly carried out steps of:

a first step of adding a partial multiplicative result of two numbers A and B and the previous partial modular-multiplication result so as to use the additive result as a new dividend Y;

a second step of adding a product of a least digit value $y_0$ of the dividend Y and c to a lower (e+1)–digit position of the dividend Y; and a third step of using a portion excluding the least digit of the additive result as a next modular-multiplication result.

10. A modular-multiplication method which calculates a remainder in the case of dividing a dividend Y, which is a product of two numbers A and B, by a divisor N on the basis of a Montgomery method, wherein a number expressed by $N=c2^d+1$ is used as the divisor N, and the method includes the following repeatedly carried out steps of:

a first step of adding a partial multiplicative result of two numbers A and B and the previous partial modular-multiplication result so as to use the additive result as a new dividend Y;

a second step of adding a multiplier m to the least digit of the dividend Y and adding a product of the multiplier m and c to a lower d-bit position of the dividend Y, the multiplier m being complement on two of the least digit value $y_0$ of the dividend Y; and a third step of using a portion excluding the least digit of the additive result as a next modular-multiplication result.

11. The modular-multiplication method according to claim 10, wherein the product of the multiplier m and c is shifted to a higher side by d bits so as to be added to the dividend Y in adding the product of the multiplier m and c to a lower d-bit position of the dividend Y.

12. A modular-multiplication method which calculates a remainder in the case of dividing a dividend Y, which is a product of two numbers A and B, by a divisor N on the basis of a Montgomery method, wherein a number expressed by $N=c2^d+1$ is used as the divisor N, and d is set to e time of k (d=ek), the number of bits of k being one digit, and the method includes the following repeatedly carried out steps of:

a first step of adding a partial multiplicative result of two numbers A and B and the previous partial modular-multiplication result so as to use, the additive result as a new dividend Y;

a second step of adding a multiplier m to the least digit of the dividend Y and adding a product of the multiplier m and c to a lower (e+1)–digit position of the dividend Y, the multiplier m being complement on two of the least digit value $y_0$ of the dividend Y; and a third step of using a portion excluding the least digit of the additive result as a next modular-multiplication result.

13. A remainder calculating apparatus which calculates a remainder in the case of dividing a dividend Y by a divisor N ($N=c2^d-1$) on the basis of a Montgomery method, comprising:

a multiplier for obtaining a product of a least digit value $y_0$ of the dividend Y and c;

an adder for adding the multiplicative result to a lower d-bit position of the dividend Y; and a register for storing a portion excluding the least digit of the additive result as a next dividend.

14. A remainder calculating apparatus which calculates a remainder in the case of dividing a dividend Y by a divisor N ($N=c2^d+1$) on the basis of a Montgomery method, comprising:

a multiplier for obtaining a product of a multiplier m and c, the multiplier m being complement on two of the least digit value $y_0$ of the dividend Y;

an adder for adding the multiplicative result to a lower d-bit position of the dividend Y and adding the multiplier m to the least digit of the dividend Y; and a register for storing a portion excluding the least digit of the additive result as a next dividend.

15. A modular-multiplication apparatus which calculates a remainder in the case of dividing a dividend Y, which is a product of two numbers A and B, by a divisor N ($N=c2^d-1$) on the basis of a Montgomery method, comprising:

a register for adding a partial multiplicative result of two numbers A and B and the previous partial modular-multiplication result so as to store the additive result as a new dividend Y;

a multiplier for obtaining a product of a least digit value $y_0$ of the dividend Y and c; and an adder for adding the multiplicative result to a lower d-bit position of the dividend Y, wherein a portion excluding the least digit of the additive result is set as a next modular-multiplication result.

16. A modular-multiplication apparatus which calculates a remainder in the case of dividing a dividend Y, which is a product of two numbers A and B, by a divisor N ($N=c2^d+1$) on the basis of a Montgomery method, comprising:

a register for adding a partial multiplicative result of two numbers A and B and the previous partial modular-multiplication result so as to store the additive result as a new dividend Y;

a multiplier for obtaining a product of a multiplier m and c, the multiplier m being complement on two of the least digit value $y_0$ of the dividend Y; and an adder for adding the multiplicative result to a lower d-bit position of the dividend Y and adding the multiplier m to the least digit of the dividend Y, wherein a portion excluding the least digit of the additive result is set as a next modular-multiplication result.

17. A recording medium having a computer readable program for causing a computer to carry out a remainder calculation in the case of dividing a dividend Y by a divisor N ($N=c2^d-1$) on the basis of a Montgomery method, comprising:

a program for causing the computer to add a product of a least digit value $y_0$ of the dividend Y and c to a lower d-bit position of the dividend Y; and a program for causing the computer to set a portion excluding the least digit of the additive result as a next dividend.

18. A recording medium having a computer readable program for causing a computer to carry out a remainder calculation in the case of dividing a dividend Y by a divisor N ($N=c2^d+1$) on the basis of a Montgomery method, comprising:

a program for causing the computer to add a multiplier m to the least digit of the dividend Y and to add a product of the multiplier m and c to a lower d-bit position of the dividend Y, the multiplier m being complement on two of the least digit value $y_0$ of the dividend Y; and a program for causing the computer to set a portion excluding the least digit of the additive result as a next dividend.

19. A recording medium having a computer readable program for causing a computer to carry out a modular-multiplication in the case of dividing a dividend Y, which is a product of two numbers A and B, by a divisor N ($N=c2^d-1$) on the basis of a Montgomery method, comprising:

a program for causing the computer to add a partial multiplicative result of two numbers A and B and the previous partial modular-multiplication result so as to set the additive result as a new dividend Y;

a program for causing the computer to add a product of a least digit value $y_0$ of the dividend Y and c to a lower d-bit position of the dividend Y; and a program for causing the computer to set a portion excluding the least digit of the additive result as a next modular-multiplication result.

20. A recording medium having a computer readable program for causing a computer to carry out a modular-multiplication in the case of dividing a dividend Y, which is a product of two numbers A and B, by a divisor N ($N=c2^d+1$) on the basis of a Montgomery method, comprising:

a program for causing the computer to add a partial multiplicative result of two numbers A and B and the previous partial modular-multiplication result so as to set the additive result as a new dividend Y;

a program for causing the computer to add a multiplier m to the least digit of the dividend Y and to add a product of the multiplier m and c to a lower d-bit position of the dividend Y, the multiplier m being complement on two of the least digit value $y_0$ of the dividend Y; and a program for causing the computer to set a portion excluding the least digit of the additive result as a next modular-multiplication result.

* * * * *

UNITED STATES PATENT AND TRADEMARK OFFICE
CERTIFICATE OF CORRECTION

PATENT NO. : 6,415,310 B1
DATED : July 2, 2002
INVENTOR(S) : Masahiko Takenanka et al.

It is certified that error appears in the above-identified patent and that said Letters Patent is hereby corrected as shown below:

<u>Column 16,</u>
Line 31, after "-1" insert -- ) --.
Line 32, delete ")".

Signed and Sealed this

Seventeenth Day of September, 2002

Attest:

JAMES E. ROGAN
Attesting Officer  *Director of the United States Patent and Trademark Office*